(12) United States Patent
Tamayama et al.

(10) Patent No.: US 9,177,386 B2
(45) Date of Patent: Nov. 3, 2015

(54) IMAGE PROCESSING APPARATUS, IMAGE PROCESSING METHOD, AND PROGRAM

(75) Inventors: Ken Tamayama, Tokyo (JP); Masaki Handa, Tokyo (JP); Tamaki Eyama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/240,059

(22) PCT Filed: Jul. 23, 2012

(86) PCT No.: PCT/JP2012/068554
§ 371 (c)(1),
(2), (4) Date: Feb. 21, 2014

(87) PCT Pub. No.: WO2013/031424
PCT Pub. Date: Mar. 7, 2013

(65) Prior Publication Data
US 2014/0185938 A1    Jul. 3, 2014

(30) Foreign Application Priority Data

Sep. 2, 2011  (JP) ................................. 2011-191188
Jun. 28, 2012  (JP) ................................. 2012-145054

(51) Int. Cl.
*G06K 9/46* (2006.01)
*G06T 7/20* (2006.01)
*H04N 19/527* (2014.01)
*H04N 19/513* (2014.01)

(52) U.S. Cl.
CPC ............ *G06T 7/2013* (2013.01); *H04N 19/521* (2014.11); *H04N 19/527* (2014.11)

(58) Field of Classification Search
None
See application file for complete search history.

(56) References Cited

U.S. PATENT DOCUMENTS

| | | | | | |
|---|---|---|---|---|---|
| 5,982,439 | A | * | 11/1999 | Parke | ........................ 375/240.16 |
| 2003/0059089 | A1 | * | 3/2003 | Quinlan et al. | ............... 382/107 |
| 2009/0074071 | A1 | * | 3/2009 | Nagumo et al. | ......... 375/240.16 |
| 2009/0257498 | A1 | * | 10/2009 | Kurata | ..................... 375/240.16 |

FOREIGN PATENT DOCUMENTS

| | | |
|---|---|---|
| JP | 2009-065332 | 3/2009 |
| JP | 2009-258868 | 11/2009 |
| JP | 2010-147985 | 7/2010 |

* cited by examiner

*Primary Examiner* — Daniel Mariam
(74) *Attorney, Agent, or Firm* — Paratus Law Group, PLLC

(57) ABSTRACT

There are provided an apparatus and a method for executing calculation of a global motion vector (GMV) with a high degree of reliability. Local motion vectors (LMV) corresponding to blocks and block weights as reliability indicators of the LMVs of the respective blocks are calculated, and the global motion vector (GMV) is calculated on the basis of the block weights. By calculating a degree of reliability of the local motion vector (LMV) corresponding to each block of a target block and near-field blocks adjacent to the target block and a degree of similarity between the local motion vectors (LMV) of the target block and each near-field block, the block weight is calculated through arithmetic processing to which the degree of reliability and the degree of similarity are applied. With the present configuration, it is possible to efficiently calculate the global motion vector (GMV) with a high degree of reliability.

12 Claims, 17 Drawing Sheets

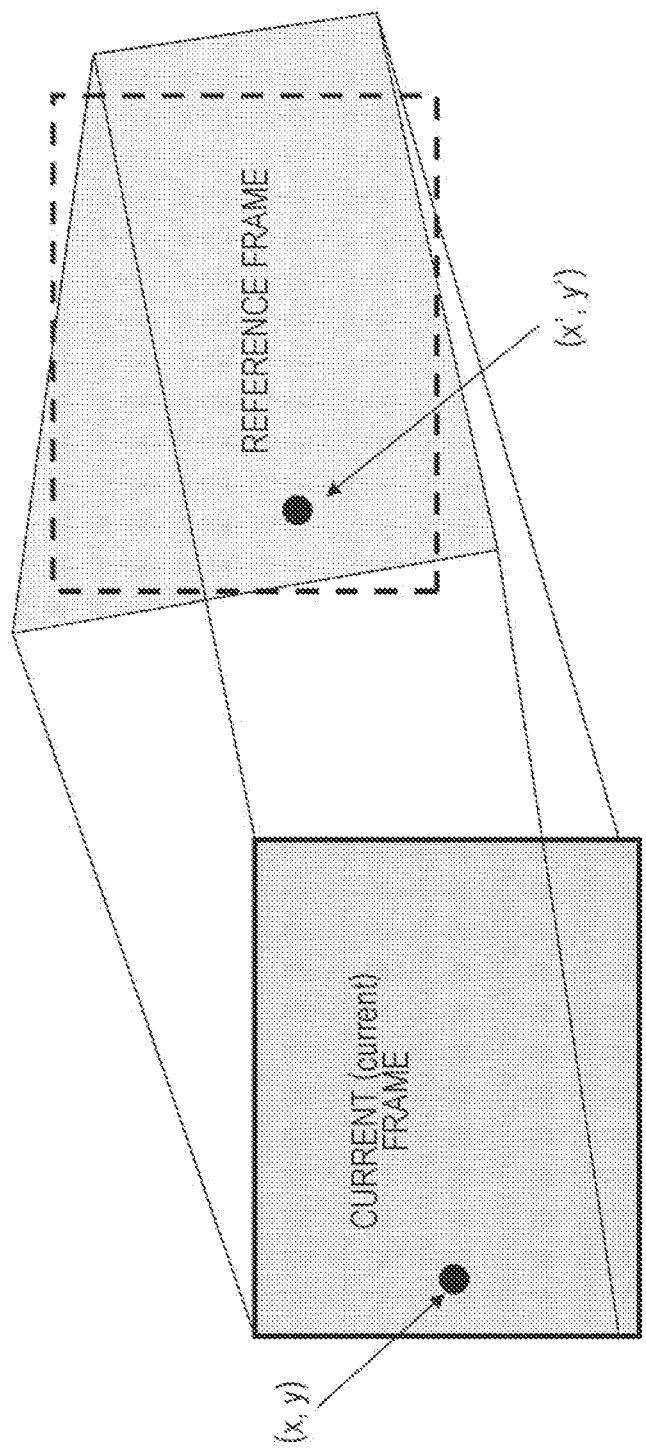

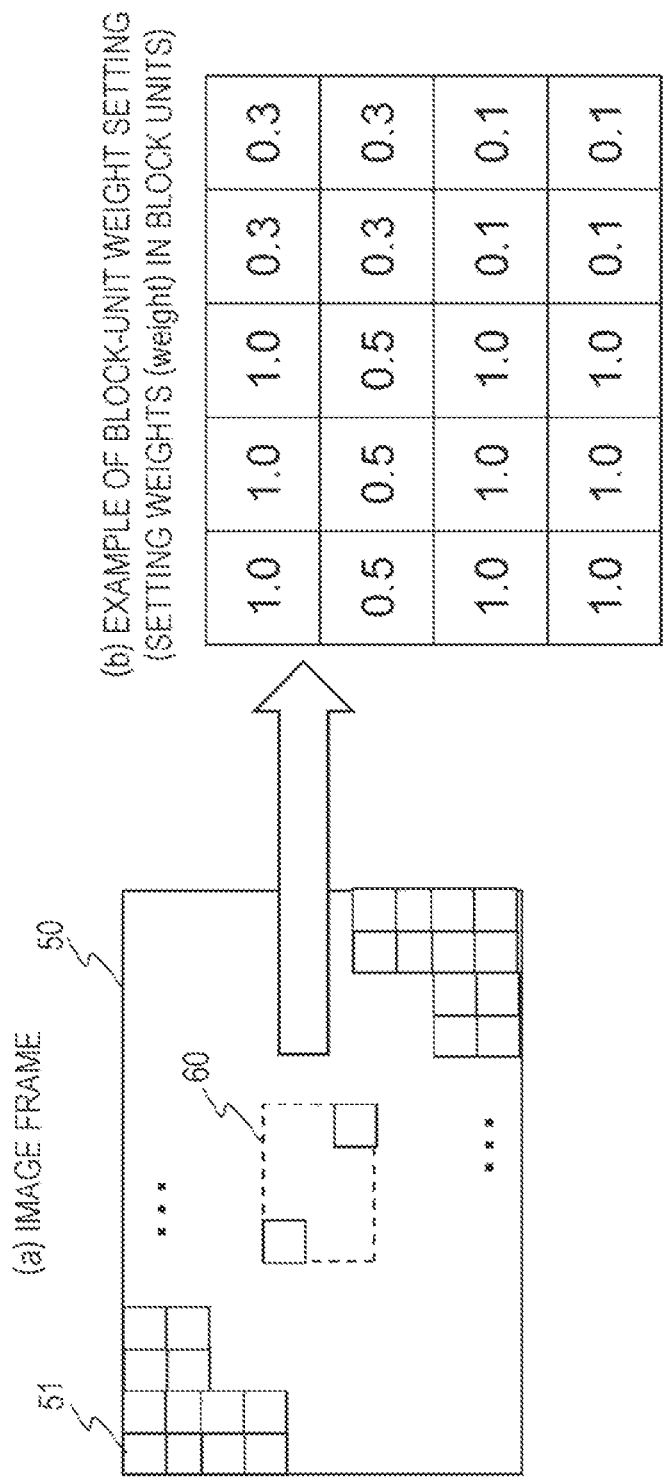

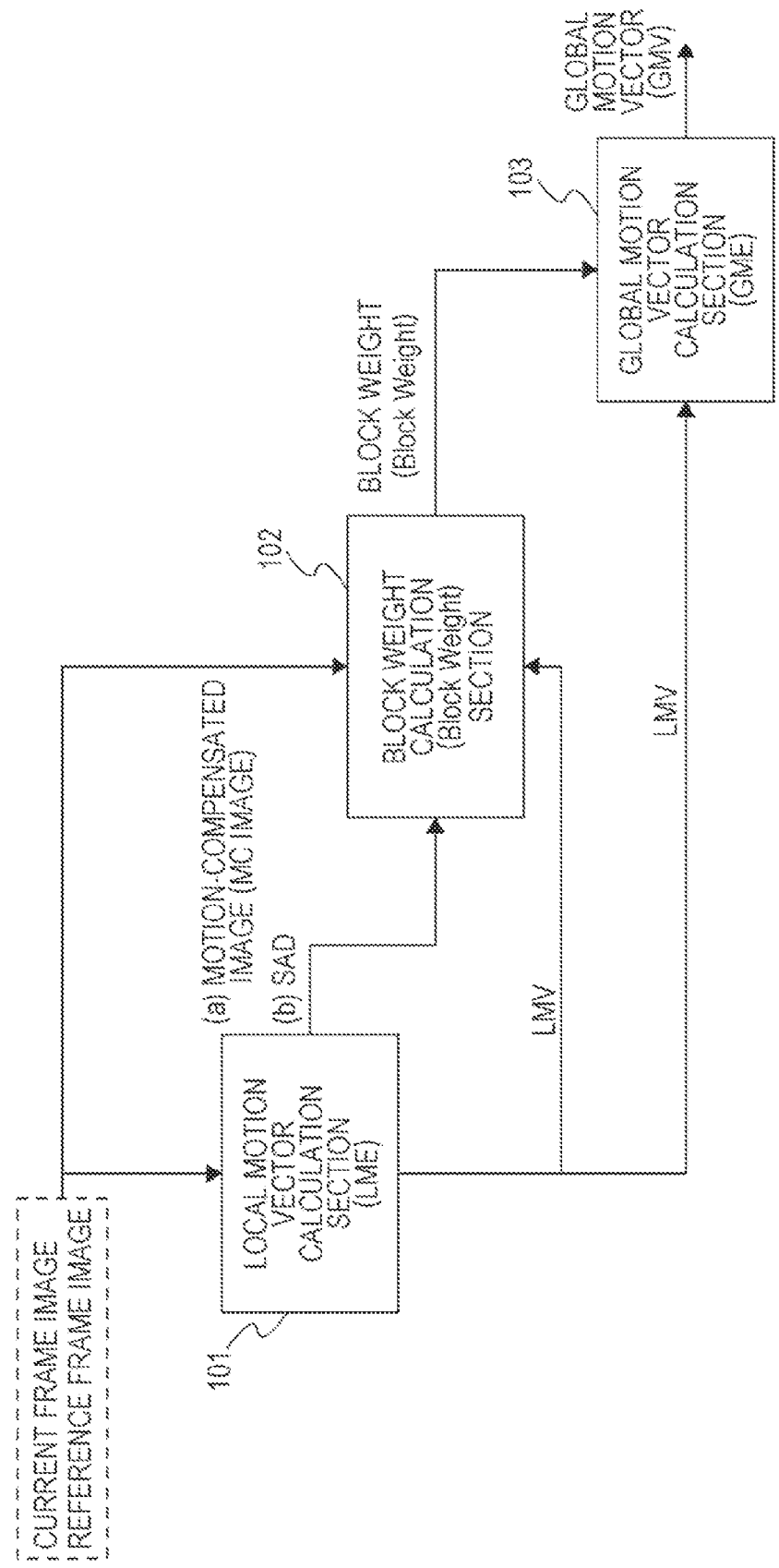

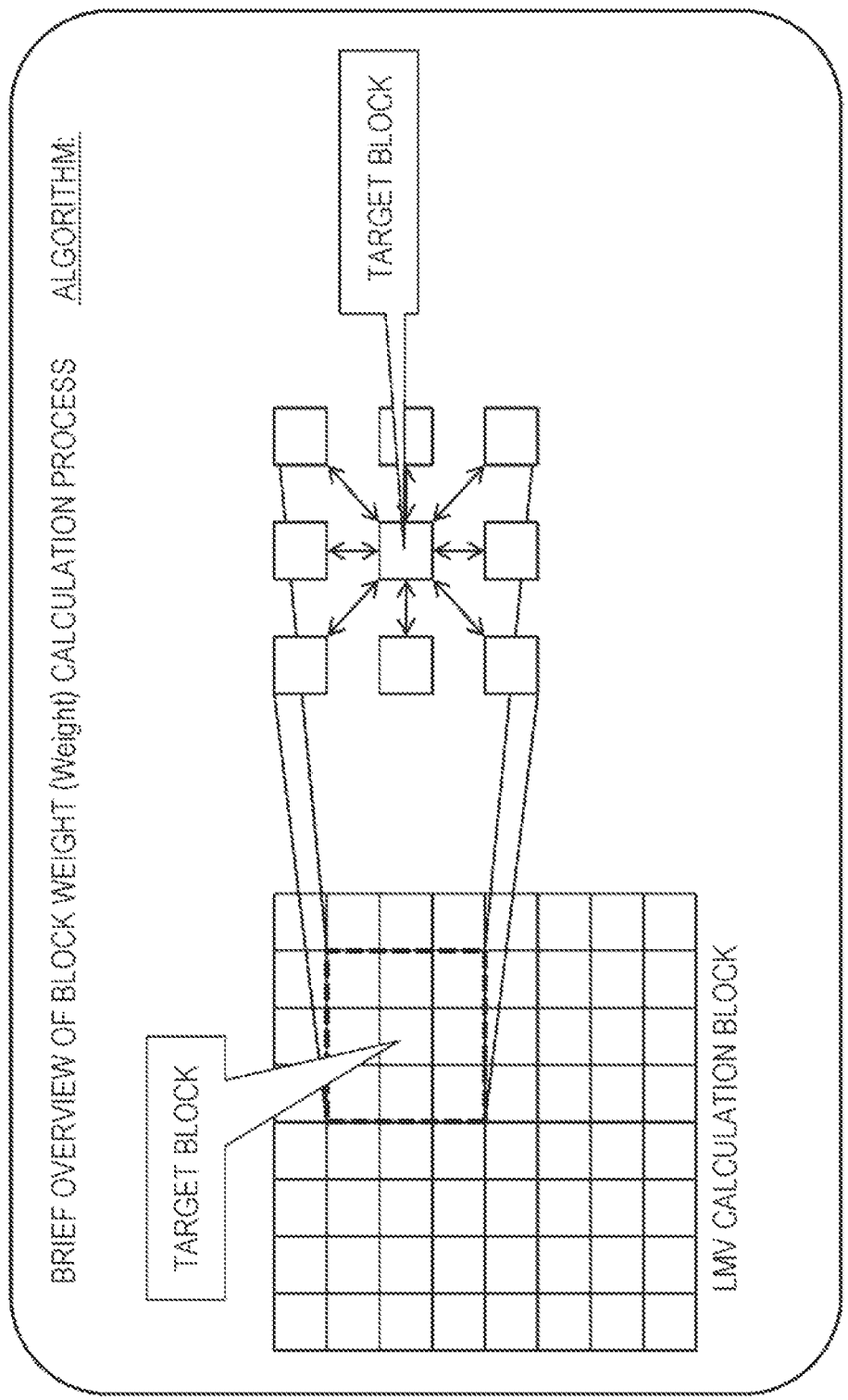

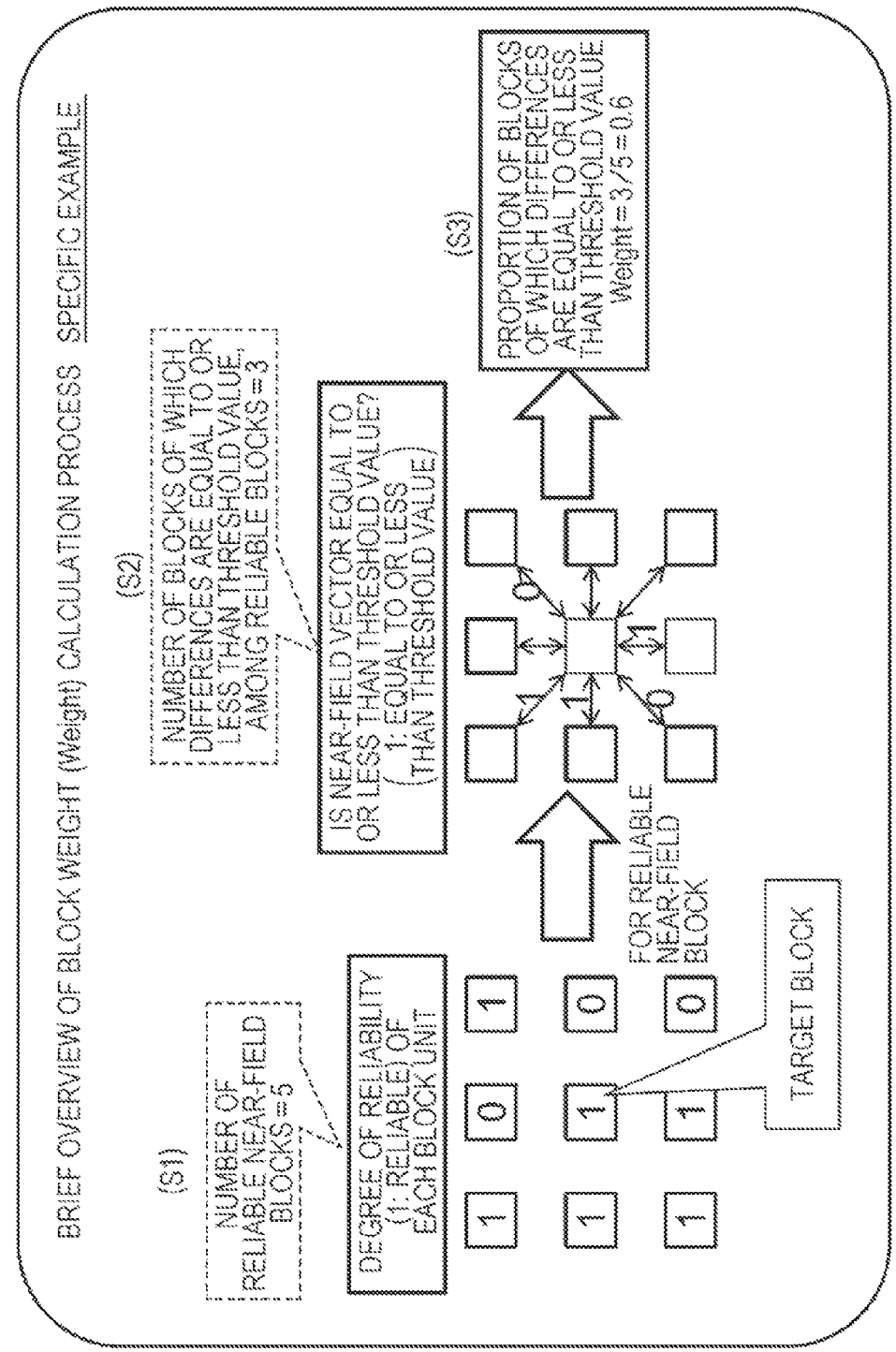

FIG. 8

| EXAMPLE OF DEGREE OF RELIABILITY | |
|---|---|
| (1) SAD VALUE FOR EACH LMV | $SAD(x, y, X, Y)$ |
| (2) VARIANCE OF PIXEL VALUES WITHIN BLOCK | $E(R(x,y)) = \frac{1}{BlockSize^2} \sum_{i,j \in BlockSize} R(x+i, y+j)$<br>$V(R(x,y)) = \frac{1}{BlockSize^2} \sum_{i,j \in BlockSize} (R(x+i, y+j))^2 - E^2(R(x,y))$<br>$Reliability\ y = V(R(x,y)) \cdot V(T(x,y))$ |
| (3) RATIO OF FIRST AND SECOND MINIMUM VALUES OF SAD | $Reliability\ y = \frac{SAD_{2nd}}{SAD_{MIN}}$ |
| (4) NUMBER OF FEATURE POINTS WITHIN BLOCK | $Reliability\ y = NF(R(x,y)) \cdot NF(T(x,y))$<br>BLOCK IMAGE → FEATURE POINT DETECTION → NUMBER OF FEATURE POINTS<br>SIFT, SURF, FAST, Harris, Corner etc. |

FIG. 9
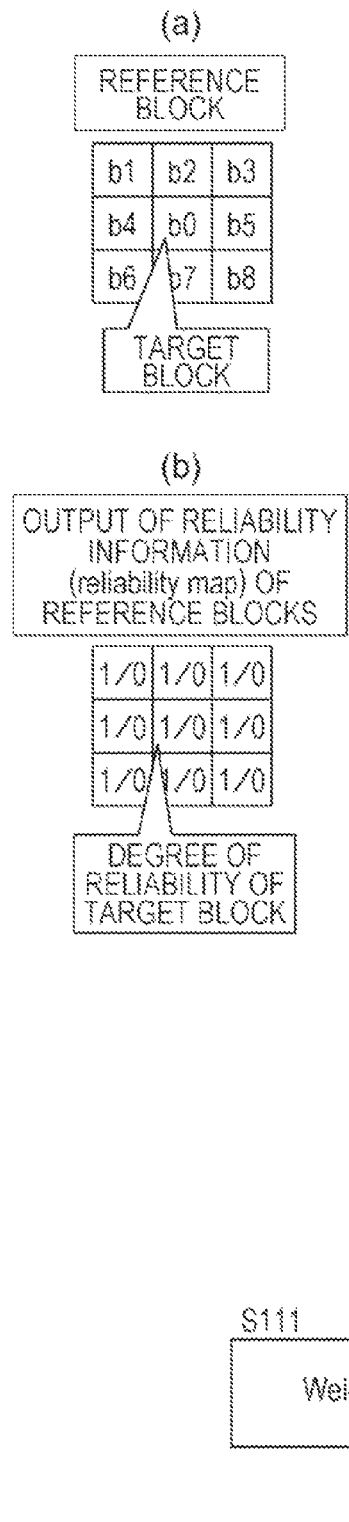
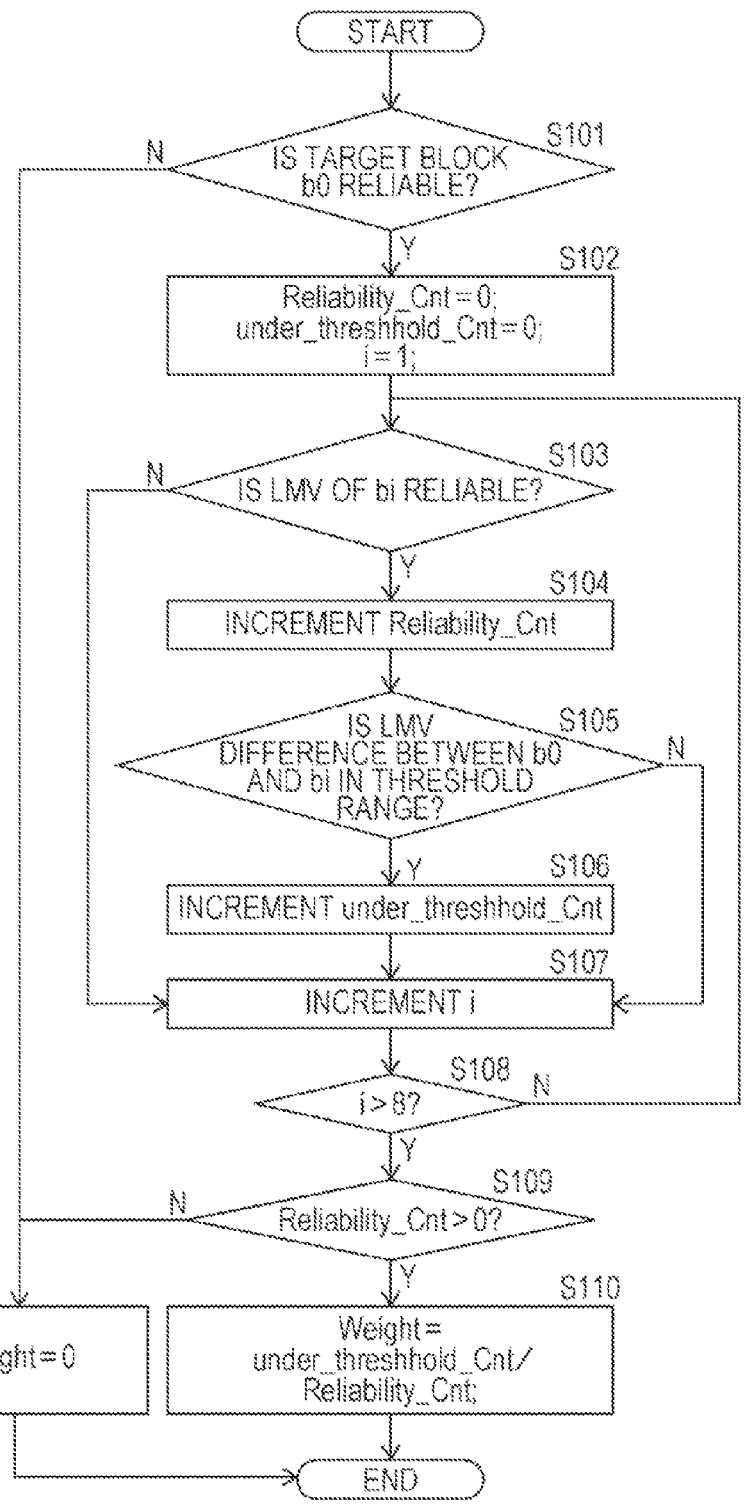

FIG. 15

DERIVATION OF GMV

DERIVATION OF GMV

$$Cost = \sum_n W_n \left[ \begin{bmatrix} x' \\ y' \end{bmatrix}_n - \left( \begin{bmatrix} x \\ y \end{bmatrix}_n + \begin{bmatrix} u \\ v \end{bmatrix}_n \right) \right]^2$$

$$0 \leq W_n \leq 1$$

$$GMV = \arg\min_{a,b,\theta} Cost\left( \begin{bmatrix} x \\ y \end{bmatrix}_n, \begin{bmatrix} u \\ v \end{bmatrix}_n, \begin{bmatrix} a \\ b \end{bmatrix}, \theta \right)$$

$$GMV = \arg\min_{a_0,a_1,a_2,b_0,b_1,b_2} Cost\left( \begin{bmatrix} x \\ y \end{bmatrix}_n, \begin{bmatrix} u \\ v \end{bmatrix}_n, \begin{bmatrix} a_0 \\ b_0 \end{bmatrix}, \begin{bmatrix} a_1 \\ b_1 \end{bmatrix}, \begin{bmatrix} a_2 \\ b_2 \end{bmatrix} \right)$$

3 AXES

6 AXES

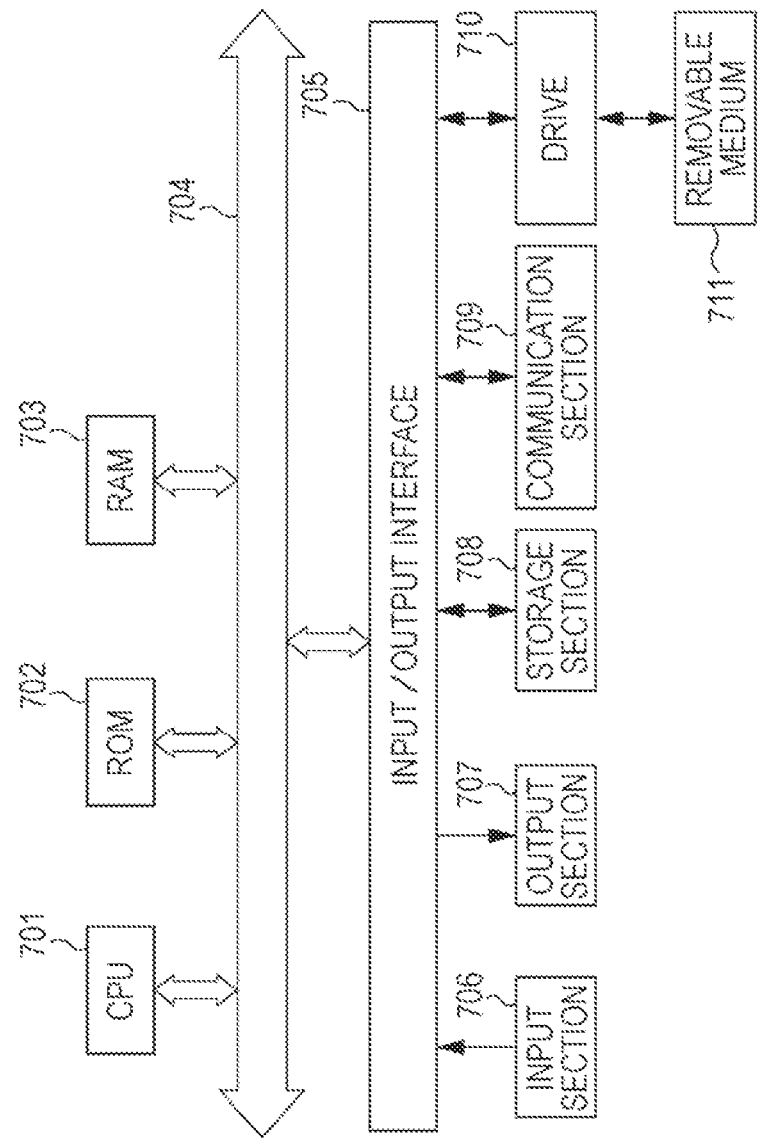

IMAGE PROCESSING APPARATUS, IMAGE PROCESSING METHOD, AND PROGRAM

CROSS REFERENCE TO PRIOR APPLICATIONS

This application is a National Stage patent application of PCT International Patent Application No. PCT/JP2012/068554 (filed on Jul. 23, 2012) under 35 U.S.C. §371, which claims priority to Japanese Patent Application Nos. 2011-191188 (filed on Sep. 2, 2011) and 2012-145054 (filed on Jun. 28, 2012), which are all hereby incorporated by reference in their entirety.

TECHNICAL FIELD

The present disclosure relates to an image processing apparatus, an image processing method, and a program. In particular, the disclosure relates to an image processing apparatus, an image processing method, and a program for executing a process of detecting motion vectors in an image.

BACKGROUND ART

In image encoding such as compression of a moving image, motion vectors are detected, and a data compression process based on motion vector information is executed. In the MPEG system known as an image encoding system, for example, a process of dividing each frame into blocks and detecting a motion vector for each of the corresponding blocks of the current frame and the reference frame is executed. However, when motion vector information in block units is included in compression data, the data volume increases. When a camera is moved by, for example, panning, tilting, hand shaking, or the like, the most motion vectors of the respective blocks are common. In such a case, it is possible to reduce the data volume by setting not motion vectors in block units but a single motion vector corresponding to a single frame and performing an encoding process.

The individual motion vectors in block units are referred to as local motion vectors (LMV), and the single motion vector corresponding to the single frame is referred to as a global motion vector (GMV). Data encoding using the global motion vector (GMV) is employed in, for example, MPEG-4.

For example, as shown in FIG. 1A, there are two frame images 10 and 11 which are photographed at times t0 and t1. The two frames are frames which are photographed by moving a camera through for example panning, tilting, hand shaking, or the like, and a photographed image is moved as a whole as shown in the drawing.

When such an image is encoded, each frame is divided into, for example, a plurality of blocks of n pixels×n pixels. Conventionally, by detecting the motion vectors (MV) in respective block units, that is, the local motion vectors (LMV), data compression and restoration processes using the individual motion vectors in block units has been performed. However, when a camera is moved through panning, tilting, hand shaking, or the like, as shown in FIG. 1B, the motion vectors of any and every block become substantially the same vectors.

In such a case, as shown in FIG. 1C, by executing the image encoding using a single motion vector 21 which represents a motion of the entire screen, it is possible to greatly improve encoding efficiency. Such a vector, which represents the motion of the entire screen, is referred to as a global motion vector (GMV).

The global motion vector (GMV) can be represented as data which uses affine transformation and projection shadow transformation accompanied with not only simple parallel movement but also rotation, enlargement, and reduction by using a plurality of parameters, as shown in the drawing. As described above, as the encoding method to which the global motion vector (GMV) is applied, MPEG-4 or the like is employed.

In MPEG-4, the global motion vector (GMV) is applied, the image encoding method using global motion compensation (GMC) is employed as a standard, the global motion vector (GMV) is detected on the encoding device (Encoder) side, and restoration based on the global motion compensation (GMC) is executed by using the global motion vector (GMV) which is transferred from the decoding device (Decoder) side.

The global motion vector (GMV) is represented as data which uses parallel movement, rotation, enlargement, reduction, affine transformation, projection shadow transformation, and the like in a relationship of corresponding similar pixel positions (x, y) and (x', y') between the current frame and the reference frame as shown in FIG. 2, and normally a single global motion vector (GMV) is applied to a single frame image. It should be noted that a screen may be divided into pieces each having a size larger than, for example, a normal block size, and the global motion vectors (GMV) may be set for the respective pieces. That is, the number of the global motion vectors (GMV) is not limited to one for a frame image, and it may be possible to adopt a configuration in which a single global motion vector (GMV) as a common motion vector is set for a plurality of blocks included in the frame image or a plurality of global motion vectors (GMV) is set for a single frame.

In the case of a vector representing only for example parallel movement (translation), the global motion vector (GMV) is represented as follows by using two parameters [$a_0$, $a_1$].

$x'=x+a_0$ $y'=y+a_1$

The global motion vector (GMV), in which parallel movement (translation) and rotation are considered, is represented as follows by using three parameters [$a_0$, $a_1$, $a_2$].

$x'=\sin a_0 x - \cos a_0 y + a_2$ $y'=\cos a_0 x + \sin a_0 y + a_3$

The global motion vector (GMV), which is compliant with affine transformation, is represented as follows by using six parameters [$a_0$, $a_1$, $a_2$, $a_3$, $a_4$, $a_5$].

$x'=a_0 x - a_1 y + a_2$ $y'=a_3 x + a_4 y + a_5$

The global motion vector (GMV), which is compliant with projection transformation, is represented as follows by using eight parameters [$a_0$, $a_1$, $a_2$, $a_3$, $a_4$, $a_5$, $a_6$, $a_7$].

$x'=((a_0 x + a_1 y + a_2)/(a_6 x + a_7 y + 1))$ $y'=((a_3 x + a_4 y + a_5)/(a_6 x + a_7 y + 1))$

In a case of obtaining the global motion vector (GMV) from a moving image frame, as shown in FIG. 2, a process using a current frame and a reference frame is executed. The reference frame is photographed at for example a certain time previous or subsequent to the current time. As the method of obtaining the global motion vector (GMV), there are several methods. However, as one of the methods, there is a method of first obtaining the local motion vectors (LMV) in block units, which are divided regions of a frame image, and obtaining the global motion vector (GMV) by using the local motion vectors (LMV).

The method is a method of first obtaining the local motion vectors (LMV) in block units, selecting the local motion vectors (LMV) with high degrees of reliability from a plurality of local motion vectors (LMV) corresponding to the number of blocks, and obtaining a single global motion vector (GMV) on the basis of only the selected local motion vectors (LMV) with high degrees of reliability.

For example, in a case where p local motion vectors (LMV) corresponding to the number of p blocks is obtained, q local motion vectors (LMV) with high degrees of reliability are selected from p local motion vectors, and a single global motion vector (GMV) is obtained on the basis of only m local motion vectors (LMV) with high degrees of reliability, without using (p-q) local motion vectors (LMV) with low degrees of reliability.

As the reliability information of the local motion vectors (LMV), information as to whether or not it is possible to obtain clear feature point matching information through for example block matching between the current frame and the reference frame is used. Further, as the method of obtaining the single global motion vector (GMV) on the basis of the local motion vectors (LMV) with high degrees of reliability, for example, a least-squares method is applied.

A method of deriving the global motion vector (GMV) using the local motion vectors (LMV) is advantageous in that it can be executed as an extension of conventional local motion vector (LMV) calculation and the existing configuration can be used. However, there is a disadvantage in that, when the number of local motion vectors (LMV) with high degrees of reliability is small, the degree of reliability of the global motion vector (GMV) is extremely lowered.

As one proposal to solve the disadvantage, there is a technique disclosed in PTL 1 (Japanese Unexamined Patent Application Publication No. 2009-65332).

PTL 1 discloses, for example, a method of obtaining an average value of the local motion vectors (LMV) corresponding to the blocks, which are divided regions of a frame image constituting a moving image, and comparing with the average value.

However, when various different local motion vectors (LMV) are set in a certain image region, incidentally, the average value may become a vector approximate to a vector of a target block. In such a case, there is a problem in that exact processes may not be performed as the situation demands.

CITATION LIST

Patent Literature

PTL 1: Japanese Unexamined Patent Application Publication No. 2009-065332

SUMMARY OF INVENTION

Technical Problem

The present disclosure has been made in view of, for example, the above-mentioned problem, and its object is to provide an image processing apparatus, an image processing method, and a program capable of calculating a global motion vector (GMV) with a higher degree of reliability.

Solution to Problem

According to a first aspect of the present disclosure, there is provided an image processing apparatus including:

a local motion vector calculation section that sets blocks, which are divided regions of a frame image, with spacings interposed therebetween in the frame image, and calculates a motion vector, which corresponds to each set block, as a local motion vector (LMV);

a block weight calculation section that calculates a block weight as a reliability indicator of the local motion vector (LMV) which corresponds to each block; and a global motion vector calculation section that inputs the local motion vectors (LMV) and the block weights, and calculates a global motion vector (GMV) which is a common motion vector to the plurality of blocks included in the frame image, in which the block weight calculation section calculates a degree of reliability of the local motion vector (LMV) corresponding to each block of a target block and near-field blocks adjacent to the target block, and a degree of similarity between the local motion vectors (LMV) of the target block and each near-field block, and calculates the block weight through arithmetic processing to which the degree of reliability and the degree of similarity are applied.

Further, in the image processing apparatus according to the first aspect of the present disclosure, the block weight calculation section extracts near-field blocks, of which the degrees of reliability are high, as reliable near-field blocks, extracts similar blocks, of which the degrees of similarity are high, among the reliable near-field blocks, and executes a process of setting a ratio of the similar blocks to the reliable near-field blocks as a weight of the target block.

Furthermore in the image processing apparatus according to the first aspect of the present disclosure, the block weight calculation section calculates the degree of reliability by applying a sum of absolute pixel value differences between the blocks which are associated on the basis of the local motion vectors (LMV) corresponding to the respective blocks.

In addition, in the image processing apparatus according to the first aspect of the present disclosure, the block weight calculation section calculates the degree of reliability by applying the number of feature points or a variance of the blocks which are associated on the basis of the local motion vectors (LMV) corresponding to the respective blocks.

Moreover, in the image processing apparatus according to the first aspect of the present disclosure, the block weight calculation section executes the calculation of the degree of similarity by determining whether or not each local motion vector (LMV) of the target block and the near-field blocks is approximate to a motion vector corresponding to rotation of one global motion (GMV).

Further, in the image processing apparatus according to the first aspect of the present disclosure, the block weight calculation section executes the calculation of the degree of similarity by determining, in consideration of an allowable rotation angle at which rotation can be corrected by an image correction section in the image processing apparatus, whether or not each local motion vector (LMV) of the target block and the near-field blocks is approximate to the motion vector corresponding to the rotation of the global motion (GMV) within the allowable rotation angle.

Furthermore, in the image processing apparatus according to the first aspect of the present disclosure, the block weight calculation section calculates the block weight by multiplying the degree of reliability of the target block with a result of dividing a result of addition of values, which are obtained by multiplying the degrees of similarity between the target block and the near-field blocks with the degrees of reliability of the near-field blocks, by a value of addition of the degrees of reliability of the near-field blocks.

In addition, in the image processing apparatus according to the first aspect of the present disclosure, the block weight calculation section calculates, as the block weight, a result of dividing a result of addition of values, which are obtained by multiplying the degrees of similarity between the target block and the near-field blocks with the degrees of reliability of the near-field blocks, by a value of addition of the degrees of reliability of the near-field blocks.

Moreover, in the image processing apparatus according to the first aspect of the present disclosure, the block weight calculation section calculates, as the block weight, a result of dividing a value of addition of the degrees of similarity between the target block and the near-field blocks by a value of addition of the degrees of reliability of the near-field blocks.

Further, in the image processing apparatus according to the first aspect of the present disclosure, the global motion vector calculation section calculates parameters of the global motion vector (GMV) for minimizing a cost by applying a cost computation expression to which the local motion vectors (LMV) corresponding to the respective blocks and the respective block weights are applied.

Furthermore, in the image processing apparatus according to the first aspect of the present disclosure, the global motion vector calculation section calculates parameters of a three-axis-compliant global motion vector, in which translation and rotation are considered, or parameters of a six-axis-compliant global motion vector in which affine transformation is considered.

In addition, according to a second aspect of the present disclosure, there is provided an image processing method executed by an image processing apparatus, the image processing method including:

a local motion vector calculation step in which a local motion vector calculation section sets blocks, which are divided regions of a frame image, with spacings interposed therebetween in the frame image, and calculates a motion vector, which corresponds to each set block, as a local motion vector (LMV);

a block weight calculation step in which a block weight calculation section calculates a block weight as a reliability indicator of the local motion vector (LMV) which corresponds to each block; and a global motion vector calculation step in which a global motion vector calculation section inputs the local motion vectors (LMV) and the block weights, and calculates a global motion vector (GMV) which is a common motion vector to the plurality of blocks included in the frame image, in which in the block weight calculation step, the block weight calculation section calculates a degree of reliability of the local motion vector (LMV) corresponding to each block of a target block and near-field blocks adjacent to the target block, and a degree of similarity between the local motion vectors (LMV) of the target block and each near-field block, and calculates the block weight through arithmetic processing to which the degree of reliability and the degree of similarity are applied.

Moreover, according to a third aspect of the present disclosure, there is provided a program causing an image processing apparatus to execute image processing of:

a local motion vector calculation step of causing a local motion vector calculation section to set blocks, which are divided regions of a frame image, with spacings interposed therebetween in the frame image, and calculate a motion vector, which corresponds to each set block, as a local motion vector (LMV);

a block weight calculation step of causing a block weight calculation section to calculate a block weight as a reliability indicator of the local motion vector (LMV) which corresponds to each block; and a global motion vector calculation step of causing a global motion vector calculation section to input the local motion vectors (LMV) and the block weights, and calculate a global motion vector (GMV) which is a common motion vector to the plurality of blocks included in the frame image, in which in the block weight calculation step, by calculating a degree of reliability of the local motion vector (LMV) corresponding to each block of a target block and near-field blocks adjacent to the target block and a degree of similarity between the local motion vectors (LMV) of the target block and each near-field block, the block weight is calculated through arithmetic processing to which the degree of reliability and the degree of similarity are applied.

In addition, the program of the present disclosure is, for example, a program that can be provided through a storage medium and a communication medium. The media are provided in a computer readable format for a computer system or an information processing apparatus capable of executing various program codes. By providing such a program in a computer readable format, processes compliant with a program are implemented on an information processing apparatus or a computer system.

Further other objects, features, and advantages of the present disclosure will be described in detail with reference to the accompanying drawings and the examples of the present disclosure to be described later. In addition, a system in the description is defined as a logical collective structure of a plurality of devices, and is not limited to devices of the respective structures within the same casing.

Advantageous Effects of Invention

According to a configuration of one example of the present disclosure, an apparatus and a method for executing calculation of a global motion vector (GMV) with a high degree of reliability are realized.

Specifically, local motion vectors (LMV) corresponding to blocks and block weights as reliability indicators of the LMVs of the respective blocks are calculated, and the global motion vector (GMV) is calculated on the basis of the block weights. By calculating a degree of reliability of the local motion vector (LMV) corresponding to each block of a target block and near-field blocks adjacent to the target block and a degree of similarity between the local motion vectors (LMV) of the target block and each near-field block, the block weight is calculated through arithmetic processing to which the degree of reliability and the degree of similarity are applied.

With the present configuration, it is possible to efficiently calculate the global motion vector (GMV) with a high degree of reliability.

BRIEF DESCRIPTION OF DRAWINGS

FIG. 2 is a diagram illustrating a relationship between a global motion vector (GMV) and corresponding points between a current frame and a reference frame.

FIG. 3 is a diagram illustrating an example of setting weights in block units.

FIG. 4 is a configuration example of an image processing apparatus.

FIG. 6 is a diagram illustrating a brief overview of a block weight calculation process executed in an image processing apparatus of the present disclosure.

FIG. 7 is a diagram illustrating a specific example of the block weight calculation process executed in the image processing apparatus of the present disclosure.

FIG. 8 is a diagram illustrating a reliability calculation process applied to a block weight determination process executed in the image processing apparatus of the present disclosure.

FIG. 9 is a diagram showing a flowchart illustrating a sequence of the block weight determination process executed in the image processing apparatus of the present disclosure.

FIG. 15 is a diagram illustrating a process of deriving the global motion vector (GMV) executed in the image processing apparatus of the present disclosure.

FIG. 17 is a diagram illustrating a configuration example of the image processing apparatus of the present disclosure.

DESCRIPTION OF EMBODIMENTS

Figure 1A:
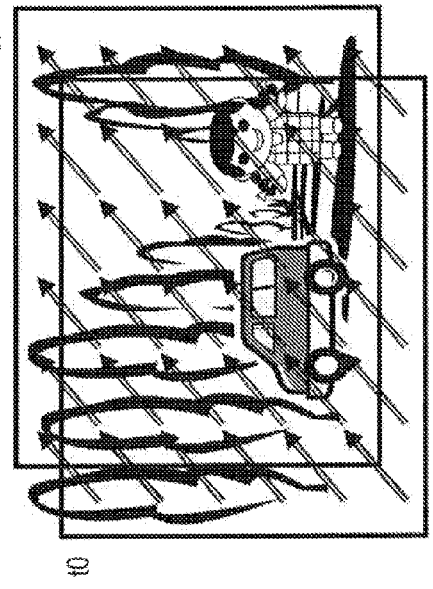
FIGS. 1A, 1B and 1C illustrate a global motion vector (GMV).
Figure 1B:
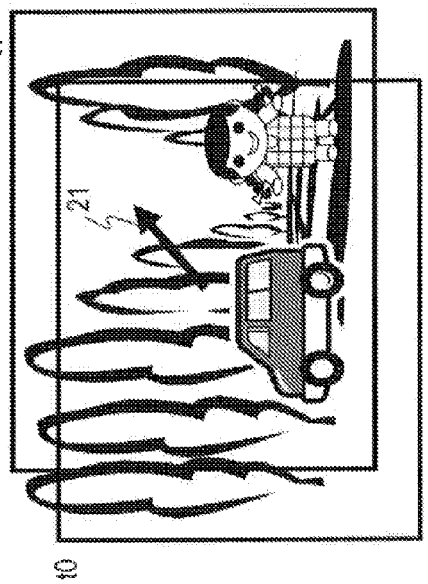
Figure 1C:
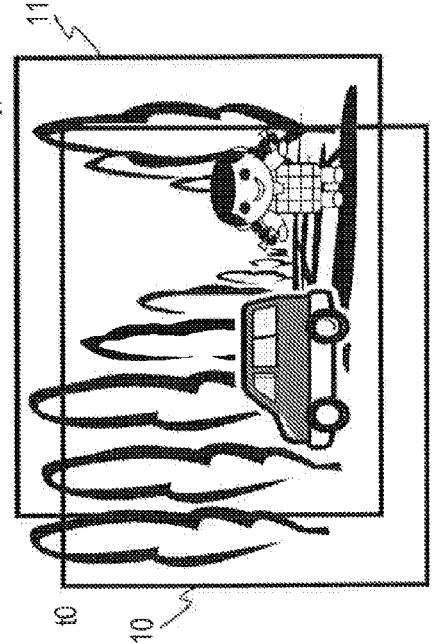

Hereinafter, an image processing apparatus, an image processing method, and a program of the present disclosure will be described in detail with reference to the drawings. It should be noted that the description will be given in order of the following items.

1. Regarding Global Motion Estimation (GME) Process Based on Weights of Local Motion Vector (LMV) Calculation Blocks 2. Brief Overview of Block Weight Calculation Process 3. Details of Block Weight Calculation Process 4. Details of Similarity Determination Process of Local Motion Vectors (LMV) Corresponding to Blocks 5. Example of Weight Calculation Process Based on Determination of Degrees of Reliability and Degrees of Similarity of LMVs of Adjacent Blocks 6. Regarding Process of Global Motion Vector Calculation Section (GME)

7. Regarding Configuration Example of Image Processing Apparatus

8. Summary of Configurations of Present Disclosure

[1. Regarding Global Motion Estimation (GME) Process Based on Weights of Local Motion Vector (LMV) Calculation Blocks]

First, a global motion estimation (GME) process based on weights of LMV setting blocks in which the local motion vectors (LMV) are set will be described.

The image processing apparatus of the present disclosure inputs continuous photographed images, and executes a process of obtaining a global motion vector (GMV) corresponding to the motion between images. The image processing apparatus of the present disclosure first obtains the local motion vectors (LMV) in block units which are divided regions of a frame image constituting an image, and obtains the global motion vector (GMV) by using the local motion vectors (LMV).

In the configuration of the present disclosure, the degrees of reliability and the degrees of similarity of the respective blocks corresponding to the local motion vectors (LMV) are calculated, the weights depending on the degrees of reliability or the degrees of similarity are defined, and the global motion vector (GMV) is obtained in consideration of the weights of the individual local motion vectors (LMV).

A brief overview of a method of deriving the global motion vector (GMV) in the image processing apparatus of the present disclosure will be described with reference to FIG. 3. In the method of the present disclosure, first, as shown in (a) IMAGE FRAME portion of FIG. 3, a single frame image 50 is divided into blocks 51 which are multiple divided image regions. Further, the local motion vector (LMV) of each block is obtained, and thereafter the weights depending on the degrees of reliability or the degrees of similarity are set in all the blocks as shown in (b) EXAMPLE OF BLOCK-UNIT WEIGHT SETTING (SETTING WEIGHTS (weight) IN BLOCK UNITS) portion of FIG. 3. The numerical values of 0.3, 0.5, 1.0, and the like shown in (b) EXAMPLE OF BLOCK-UNIT WEIGHT SETTING (SETTING WEIGHTS (weight) IN BLOCK UNITS) are numerical values which indicate the weights depending on the degrees of similarity or the degrees of reliability of the local motion vectors (LMV) in block units. 1.0 is a weight corresponding to the LMV of which the degree of reliability or the degree of similarity is highest, and the numerical values of the weights corresponding to the LMVs, of which the degrees of reliability or the degrees of similarity are lower, are smaller.

In the derivation of the global motion vector (GMV) in the image processing apparatus of the present disclosure, as shown in the example of setting weights in block units in (b) EXAMPLE OF BLOCK-UNIT WEIGHT SETTING (SETTING WEIGHTS (weight) IN BLOCK UNITS), the weights depending on the degrees of similarity or the degrees of reliability of the local motion vectors (LMV) are set in the blocks in which the respective local motion vectors (LMV) are set.

Thereafter, considering the weights of the individual local motion vectors (LMV), the global motion vector (GMV) is obtained.

A process of calculating the global motion vector (GMV) will be described in detail with reference to FIG. 4. FIG. 4 shows a configuration example of a global motion vector (GMV) generation section which is set in the image processing apparatus of the present disclosure. The input is the current frame image and the reference frame image, and the output is the global motion vector (GMV).

The reference frame image is an image which is photographed at a time different from that of the current frame image. Specifically, the image is an image of a previous frame or a subsequent frame of the current frame image. The photographing interval between the frame images is given.

The global motion vector (GMV) generation means, which is set in the image processing apparatus, includes, as shown in FIG. 4, a local motion vector calculation section (LME) 101, a block weight calculation section 102, and a global motion vector (GMV) calculation section 103.

The local motion vector calculation section (LME) 101 inputs the current frame image and the reference frame image, and calculates the motion vectors corresponding to the respective blocks which are obtained by dividing a single frame into small area blocks, that is, the local motion vectors (LMV). In addition, the process in the local motion vector calculation section (LME) 101 can be executed as, for example, a conventionally known process to which the block matching process is applied.

That is, a block, which has a pixel configuration closest to a pixel configuration of a block that is set in the current frame image, is searched for from the reference frame image. On the basis of the information on movement between the two blocks obtained as a block search result, the local motion vectors (LMV) corresponding to the respective blocks are calculated.

Figure 5A:
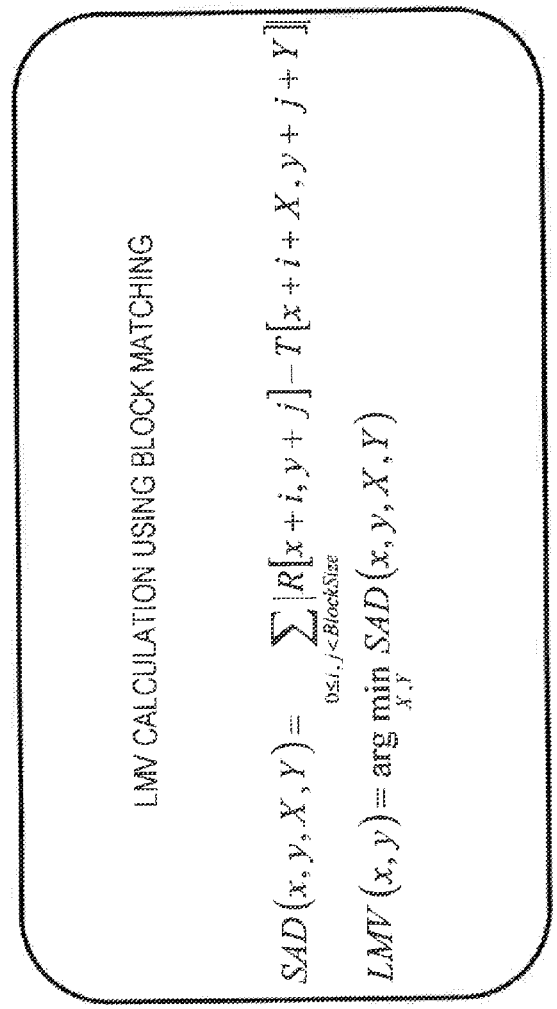
FIGS. 5A and 5B illustrate an example of a process of calculating a local motion vector (LMV) through block matching.
Figure 5B:
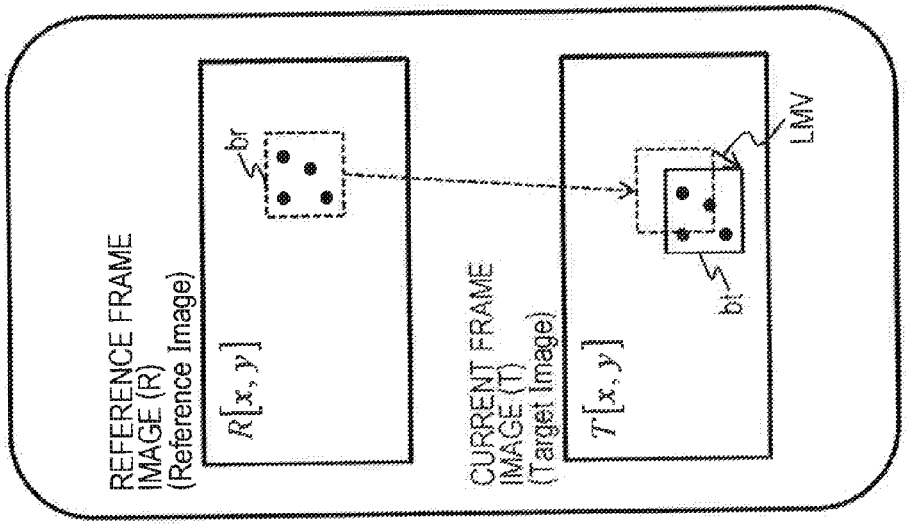

Referring to FIGS. 5A and 5B, a description will be given of an example of a process of calculating a local motion vector (LMV) to which the block matching process is applied.

FIG. 5A shows a current frame image (T) and a reference frame image (R) which is photographed immediately before the current frame image. A block br within the reference frame image is searched for, which has a pixel configuration closest to a pixel configuration of a block bt that is set in the current frame image.

A vector, which is directed from br to bt, is the local motion vector (LMV).

The process of calculating the local motion vector (LMV) is executed on the basis of the expression shown in FIG. 5B.

A sum of absolute differences (SAD) is generated, and a block, at which the SAD value becomes minimum, is selected as a corresponding block, thereby calculating the local motion vector (LMV). The SAD is a sum of absolute difference values in pixel value information of corresponding blocks between the current frame image and the reference frame image.

Specifically, on the basis of the following expression (Expression 1), the local motion vector (LMV) is calculated.

[Numerical Expression 1]

$$SAD(x, y, X, Y) = \sum_{0 \le i,j < BlockSize} |R[x+i, y+j] - T[x+i+X, y+j+Y]|$$

$$LMV(x, y) = \underset{X,Y}{\mathrm{argmin}}\ SAD(x, y, X, Y)$$

(Expression 1)

It should be noted that (x, y) corresponds to vertex coordinates of one of the blocks of the current frame image, (i, j) corresponds to a block size, and (X, Y) corresponds to components of x and y of the amounts of movement between the corresponding blocks of the current frame and the reference frame.

The local motion vectors (LMV) calculated in the local motion vector calculation section (LME) 101 are input to the block weight calculation section 102 and the global motion vector (GMV) calculation section 103.

Further, the local motion vector calculation section (LME) 101 generates a motion-compensated (MC) image and a sum of absolute differences (SAD), and inputs those to the block weight calculation section 102, at the time of the local motion vector (LMV) calculation process. The SAD is a sum of absolute difference values in pixel information of corresponding blocks between the current frame image and the reference frame image.

The motion-compensated (MC) image is a corrected image which is generated on the basis of for example a reference frame, and is an image which is obtained by correcting the reference frame image such that a subject at each pixel position of the current frame image is set at the same pixel position as the reference frame. The corrected image is generated, for example, by moving the pixel positions of the reference frame image by amounts of motion of the local motion vectors (LMV) in block units.

The block weight calculation section 102 calculates block correspondence weights (Weights) respectively corresponding to the blocks which are units of the local motion vector (LME) calculation of the current frame image, and outputs the weights to the global motion vector calculation section (GME) 103.

The block correspondence weights (Weights) are the weights which were described above with reference to FIG. 3, and are calculated depending on the degrees of reliability or the degrees of similarity of the local motion vectors (LME) corresponding to the respective blocks.

A process of calculating the block correspondence weights (Weights) will be described later in detail.

The global motion vector calculation section (GME) 103 inputs the block weights (Weights), which are calculated by the block weight calculation section 102, and the local motion vectors (LMV) corresponding to the respective blocks which are calculated by the local motion vector calculation section (LME) 101, and calculates the global motion vector (GMV) corresponding to the frame on the basis of such input data.

[2. Brief Overview of Block Weight Calculation Process]

Next, a brief overview of the block weight calculation process executed by the block weight calculation section 102 will be described.

The block weight calculation section 102 calculates weights of the respective blocks which are set in the current frame image, that is, weights depending on the degrees of reliability or the degrees of similarity of the local motion vectors (LME) corresponding to the respective blocks. The process executed by the block weight calculation section 102 will be described with reference to FIG. 6 and the following drawings.

FIG. 6 shows an algorithm of the block weight calculation process executed by the block weight calculation section 102.

A block, which is subjected to the calculation of the block weight, is set as a target block, and eight blocks around the target block are set as near-field blocks.

First, the degrees of reliability of the local motion vector (LMV) of the target block and the local motion vectors (LMV) of the respective near-field blocks are calculated.

Further, the degrees of similarity between the local motion vector (LMV) of the target block and the local motion vectors (LMV) of the respective near-field blocks are calculated.

Such reliability and similarity information pieces are applied, and the weight of the target block is calculated.

The weight of the target block corresponds to a degree of contribution of each local motion vector (LMV) at the time of calculating the global motion vector (GMV).

A specific process example of the block weight calculation process executed by the block weight calculation section 102 will be described with reference to FIG. 7 and the following drawings.

First, as shown in FIG. 7, in step (S1), blocks, of which the calculated degrees of reliability of the local motion vectors (LMV) corresponding to the respective blocks are high, are selected from the near-field blocks around the target block.

For example, the degree of reliability is set to [1] when the calculated local motion vector (LMV) corresponding to each block is reliable, and is set to [0] when the vector is unreliable.

In the example shown in FIG. 7, the number of the near-field blocks of which the degrees of reliability are high, that is, the number of the near-field blocks of which the set degrees of reliability are 1 is equal to 5.

The degrees of reliability of the local motion vectors (LMV) corresponding to the respective blocks can be calculated in various ways.

An example of a multi-reliability calculation process will be described with reference to FIG. 8.

FIG. 8 shows the following examples (1) to (4) of four reliability calculation processes.

(1) A degree of reliability based on a SAD value for each local motion vector (LMV), (2) A degree of reliability based on variance of the pixel values within a block, (3) A degree of reliability based on a ratio between first and second minimum values of SAD, and (4) A degree of reliability based on the number of feature points within a block.

(1) The degree of reliability based on the SAD value for each local motion vector (LMV) is an example in which a value of the sum of absolute differences (SAD), that is, SAD (x, y, X, Y) obtained at the time of calculation of the local motion vector (LMV) described above with reference to FIG. 5B is set as a reliability indicator. The SAD is the sum of absolute difference values in pixel information of corresponding blocks between the current frame image and the reference frame image.

For example, if the SAD calculated in the LMV calculation corresponding to a block is equal to or less than a given threshold value, the degree of reliability of the LMV of the block is set to 1 (reliable). If the SAD is greater than the given threshold value, the degree of reliability of the LMV of the block is set to 0 (unreliable).

(2) The degree of reliability based on variance of the pixel values within a block is an example of a process of setting depending on a value of multiplication of variances of the corresponding blocks between the current frame image and the reference frame image applied to the calculation of the local motion vector (LMV).

Specifically, on the basis of the following expression (Expression 2), the degree of reliability (reliability) is calculated.

[Numerical Expression 2]

$$E(R(x, y)) = \frac{1}{BlockSize^2} \sum_{0 \le i,j < BlockSize} R[x+i, y+j] \quad \text{(Expression 2)}$$

$$V(R(x, y)) = \frac{1}{BlockSize^2} \sum_{0 \le i,j < BlockSize} (R[x+i, y+j])^2 - E^2(R(x, y))$$

$$\text{Reliability} = V(R(x, y)) \cdot V(T(x, y))$$

It should be noted that, in the expression, $E(R(x, y))$ is an average pixel value of blocks of the reference frame image applied to the LMV calculation, $V(R(x, y))$ is a pixel value variance of the blocks of the reference frame image applied to the LMV calculation, and $V(T(x, y))$ is a pixel value variance of the blocks of the current frame image applied to the LMV calculation.

If the Reliability calculated on the basis of the expression (Expression 2) is equal to or greater than a given threshold value, the degree of reliability of the LMV of the block is set to 1 (reliable). If the Reliability is less than the given threshold value, the degree of reliability of the LMV of the block is set to 0 (unreliable).

(3) In the degree of reliability based on the ratio between the first and second minimum values of the SAD, the sum of absolute differences (SAD), which is obtained at the time of calculation of the local motion vector (LMV) described above with reference to FIG. 5B, is applied. The SAD is the sum of absolute difference values in pixel information of corresponding blocks between the current frame image and the reference frame image.

The SAD applied to the LMV calculation is set as $SAD_{min}$.

Further, the SAD, which is the second minimum obtained from a search result of the block search, is set as $SAD_{2nd}$.

The ratio of the two minimum values is calculated from the following calculation expression (Expression 3).

[Numerical Expression 3]

$$\text{Reliability} = \frac{SAD_{2nd}}{SAD_{MIN}} \quad \text{(Expression 3)}$$

If the Reliability calculated on the basis of the expression (Expression 3) is equal to or greater than a given threshold value, the degree of reliability of the LMV of the block is set to 1 (reliable). If the Reliability is less than the given threshold value, the degree of reliability of the LMV of the block is set to 0 (unreliable).

(4) The degree of reliability based on the number of feature points within the block is a process of setting, as an indication of the degree of reliability, a value of multiplication of the numbers of feature points of the corresponding blocks between the current frame image and the reference frame image obtained at the time of calculation of the local motion vector (LMV) described above with reference to FIG. 5B.

Specifically, on the basis of the following expression (Expression 4), a value of multiplication of the numbers of feature points of the corresponding blocks is calculated.

$$\text{Reliability} = NF(R(x,y)) \cdot (NF(T(x,y))) \quad \text{(Expression 4)}$$

However, in the expression (Expression 4), $NF(R(x, y))$ is the number of feature points of the corresponding block of the reference frame image obtained at the time of calculation of the local motion vector (LMV), and $NF(T(x, y))$ is the number of feature points of the corresponding block of the current frame image obtained at the time of calculation of the local motion vector (LMV).

If the Reliability calculated on the basis of the expression (Expression 4) is equal to or greater than a given threshold value, the degree of reliability of the LMV of the block is set to 1 (reliable). If the Reliability is less than the given threshold value, the degree of reliability of the LMV of the block is set to 0 (unreliable).

As described above, the degrees of reliability of the local motion vectors (LMV) corresponding to the respective blocks can be calculated in various ways.

The block weight calculation section 102 shown in FIG. 4 calculates the degrees of reliability corresponding to the respective blocks by applying any method of (1) to (4) described with reference to FIG. 8. It should be noted that the reliability calculation may be performed by applying a combination of the methods of (1) to (4) described with reference to FIG. 8.

Returning to FIG. 7, description of the process sequence of the block weight calculation section 102 will be continued.

In step (S1), in accordance with the above-mentioned process, as the degrees of reliability of the respective blocks, values of 1 (reliable) and 0 (unreliable) are set.

Next, in step (S2), among the reliable blocks of which the degrees of reliability are equal to 1, the number of near-field blocks, of which the differences between the local motion vector (LMV) of the target block and the local motion vectors (LMV) of the respective near-field blocks are equal to or less than a threshold value and of which the degrees of similarity are high, is acquired.

In the example shown in the drawing, the number of reliable near-field blocks is 3. Here, the reliable near-field blocks have the differences equal to or less than the threshold value, high degrees of similarity, and the degrees of reliability of 1.

Next, in step (S3), a proportion of the number of reliable near-field blocks of which the differences are equal to or less than the threshold value, that is, (the number of reliable near-field blocks of which the differences are equal to or less than the threshold value)/(the number of reliable near-field blocks)

is calculated.
In this example, (the number of reliable near-field blocks of which the differences are equal to or less than the threshold value)/(the number of reliable near-field blocks) = 3/5 = 0.6.

The block weight calculation section 102 sets a calculated value=0.6 as the weight of the target block, and outputs the calculated value to the global motion calculation section 103.

[3. Details of Block Weight Calculation Process]

Next, referring to FIG. 9 and the following drawings, a specific sequence of the block weight calculation process executed by the block weight calculation section 102 will be described.

FIG. 9 is a flowchart illustrating a specific sequence of the block weight calculation process executed by the block weight calculation section 102.

Processes of steps of a flow will be described.

It should be noted that, as shown in (a) REFERENCE BLOCK and (b) OUTPUT OF RELIABILITY INFORMATION (reliability map) OF REFERENCE BLOCKS of FIG. 9, the target block represented by b0 and the near-field blocks represented by b1 to b8, and such nine blocks are set as reference blocks.

Further, as the degrees of reliability corresponding to the respective blocks,
1: reliable
0: unreliable Such reliability information has been completely calculated.

The reliability information corresponding to the blocks is calculated by any method of (1) to (4) described above with reference to FIG. 8. In addition, when using the SAD value corresponding to each LMV of FIG. 8(1), the SAD value as an output of the local motion estimation information can be directly used as reliability information (reliability map).

In step S101, it is determined whether or not the target block b0 is reliable.

That is, it is determined whether or not the block is a block with the set degree of reliability of 1.

If the target block is a block with the set degree of reliability of 1 and is thus reliable, the flow advances to step S102. If the target block is a block with the set degree of reliability of 0 and is thus unreliable, the flow advances to step S111, and the weight thereof is set to 0.

That is, it is determined whether or not the local motion vector (LMV) of the target block is reliable. If it is determined that the block is a block with the set degree of reliability of 0 and is thus unreliable, weight=0, and the flow ends.

In step S101, if it is determined that the target block b0 is reliable, the flow advances to step S102. Then, in step S102, an initialization process is performed. Specifically, the following process is performed.

Reliability_Cnt=0;

under_threshhold_Cnt=0;

$i=1$;

Here,

Reliability_Cnt: a count indicating the number of reliable blocks with the set degrees of reliability of 1 among the eight near-field blocks, under_threshhold_Cnt: a count indicating the number of similar blocks, of which the difference with the target block is equal to or less than a threshold value, among the reliable blocks, and i: an index of the block position.

Next, in step S103, it is determined whether or not the near-field block bi is reliable.

If the near-field block bi near the target block is a block with the set degree of reliability of 1 and is thus reliable, in step S104, the count of the number of reliable blocks [Reliability_Cnt] is incremented.

If the near-field block bi is a block with the set degree of reliability of 0 and is thus unreliable, the flow advances to step S107.

In step S105, the degree of similarity between the local motion vectors (LMV) of the target block b0 and the block bi near the block is determined.

Specifically, for
the local motion vector (LMV) of the target block b0,
the local motion vector (LMV) of the near-field block bi,
it is determined whether or not these two local motion vectors are motion vectors corresponding to a single common global motion vector (GMV).

For example, if the differences of H direction components and V direction components of the respective local motion vectors (LMV) are respectively in threshold ranges, this is a condition of determination that "the differences are in threshold ranges", that is, determination of Yes.

Details of the similarity determination process will be described later.

In step S105, if it is determined that the local motion vector (LMV) of the target block b0 is similar to the local motion vector (LMV) of the near-field block bi, the flow advances to step S106, and the count [under_threshhold_Cnt] of the number of blocks equal to or less than the reliable differential threshold value is incremented.

In contrast, in step S105, if it is determined that the local motion vector (LMV) of the target block b0 is not similar to the local motion vector (LMV) of the near-field block bi, the flow advances to step S107.

Step S107 is a process of updating block No: i.

The process is sequentially executed on the near-field blocks i=1 to 8.

In step S108, it is determined that $i > 8$, all the processes of the near-field blocks B1 to b8 are completed, the flow advances to step S109.

In step S109, it is determined whether or not the count [Reliability_Cnt] of the number of reliable blocks with the set degrees of reliability of 1 among the near-field blocks is greater than 0.

That is, it is determined whether or not there is a reliable block in even one of the near-field blocks b1 to b8.

If there is no reliable block, the flow advances to step S111, the weight of the target block being set to 0.

In step S109, if it is determined that there is a reliable block with the set degree of reliability of 1 in even one of the near-field blocks b1 to b8, the flow advances to step S110.

In step S110, the weight of the target block is calculated.

For example, in accordance with the following expression, the weight of the target block is calculated.

Weight=(under_threshhold_Cnt)/(Reliability_Cnt)

That is, the weight of the target block=(the number of reliable blocks equal to or less than the differential threshold value (degree of reliability=1) among the near-field blocks)/(the number of reliable blocks among the near-field blocks), whereby the weight of the target block is calculated.

It should be noted that the process of calculating the weight of the target block represented in the expression is an example, and a weight calculation process to which another expression is applied is possible.

The other specific examples of the process of calculating the weight of the target block will be described in a latter part.

[4. Details of Similarity Determination Process of Local Motion Vectors (LMV) Corresponding to Blocks]

Next, details of the similarity determination process for the local motion vectors (LMV) corresponding to blocks will be described.

As described above, in step S105 of the flow shown in FIG. 9, the degree of similarity between the local motion vectors (LMV) of the target block b0 and the block bi near the block is determined.

That is, for the local motion vector (LMV) of the target block b0, the local motion vector (LMV) of the near-field block bi, it is determined whether or not these two local motion vectors are motion vectors corresponding to a single common global motion vector (GMV).

If the two local motion vectors are motion vectors corresponding to a single common global motion vector (GMV), the local motion vectors (LMV) are similar. That is, it is determined that the degree of similarity=1.

In contrast, if the two local motion vectors are not motion vectors corresponding to a single common global motion vector (GMV), the local motion vectors (LMV) are not similar. That is, it is determined that the degree of similarity=0.

The method of the process of determining the degrees of similarity between the local motion vector (LMV) of the target block and the local motion vectors (LMV) of the respective near-field blocks will be described with reference to FIGS. 10 and 11.

Figure 10:
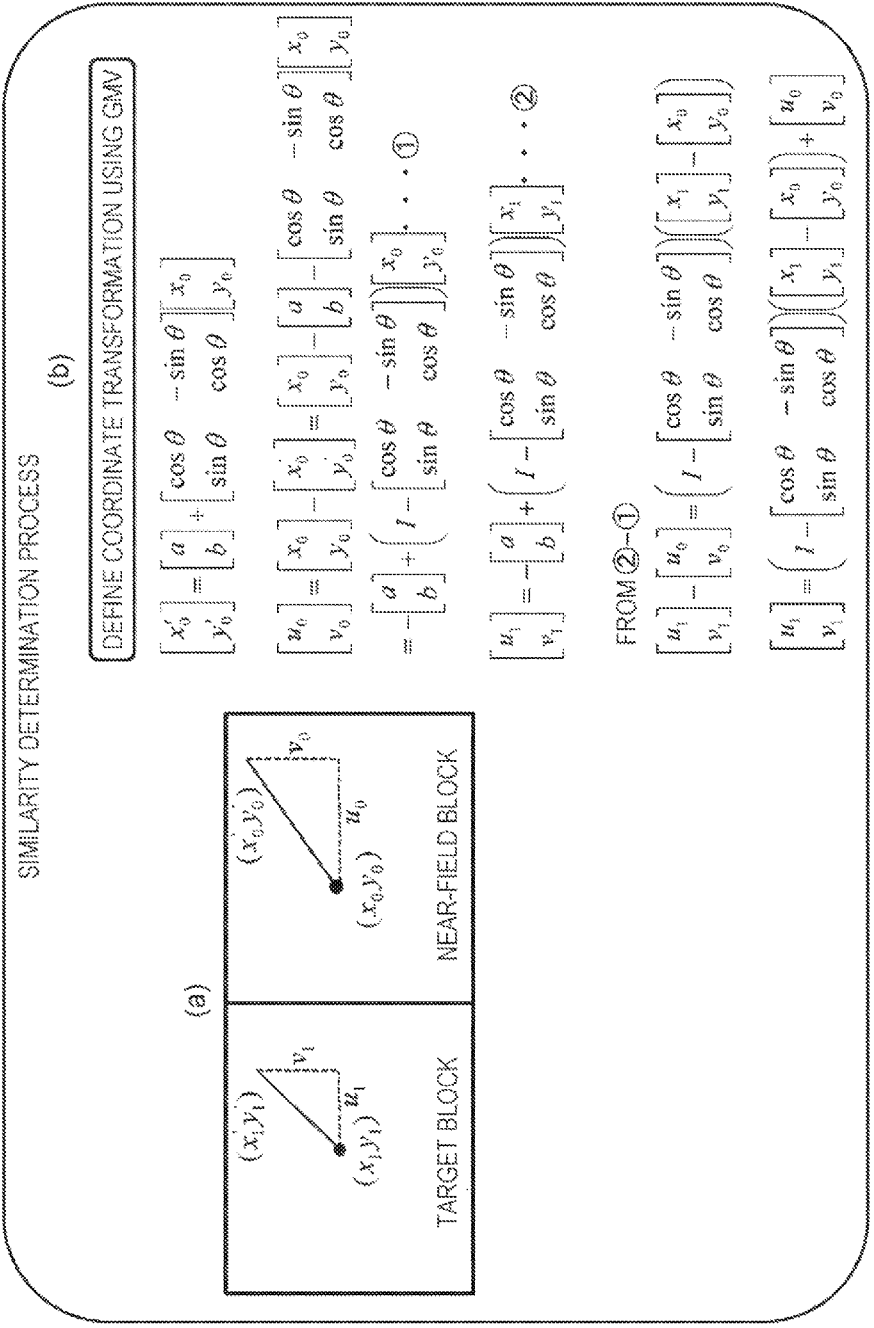
FIG. 10 is a diagram illustrating a similarity determination process applied to the block weight determination process executed in the image processing apparatus of the present disclosure.

As shown in portion (a) of FIG. 10, the local motion vector (LMV) of the target block and the local motion vectors (LMV) of the respective near-field blocks are respectively obtained.

The local motion vector (LMV) of the target block is a vector from an origin point (x1, y1) to an end point (x1', y1'), horizontal component=$u1$, and vertical component=$v1$.

That is, the local motion vector (LMV) of the target block is (u1, v1).

On the other hand, the local motion vector (LMV) of the near-field block is a vector from an origin point (x0, y0) to an end point (x0', y0'), horizontal component=$u0$, and vertical component=$v0$.

That is, the local motion vector (LMV) of the near-field block is (u0, v0).

As shown in portion (b) of FIG. 10, coordinate transformation based on the global motion vector (GMV) is defined.

The global motion vector (GMV) is a motion vector common to the whole screen, and the coordinate transformation based on the global motion vector (GMV) is defined by the following expression (Expression 5).

[Numerical Expression 4]

$$\begin{bmatrix} x'_0 \\ y'_0 \end{bmatrix} = \begin{bmatrix} a \\ b \end{bmatrix} + \begin{bmatrix} \cos\theta & -\sin\theta \\ \sin\theta & \cos\theta \end{bmatrix} \begin{bmatrix} x_0 \\ y_0 \end{bmatrix} \quad \text{(Expression 5)}$$

The expression (Expression 5) represents the coordinate transformation based on the three-axis-compliant GMV, that is, the global motion vector (GMV) in which parallel movement (translation) and rotation are considered.

(x0, y0) indicates coordinates before the transformation, (x'0, y'0) indicates coordinates after the coordinate transformation based on the global motion vector (GMV), a indicates an amount of movement in the x direction according to the global motion vector (GMV), b indicates an amount of movement in the y direction according to the global motion vector (GMV), and θ indicates a rotation angle according to the global motion vector (GMV).

By applying the local motion vector (LMV) (u0, v0) of the near-field block and the coordinate transformation expression based on the three-axis-compliant global motion vector (GMV) represented by the expression (Expression 5), the local motion vector (LMV) (u1, v1) of the target block can be represented as the following expression (Expression 6).

[Numerical Expression 5]

$$\begin{bmatrix} x'_0 \\ y'_0 \end{bmatrix} = \begin{bmatrix} a \\ b \end{bmatrix} + \begin{bmatrix} \cos\theta & -\sin\theta \\ \sin\theta & \cos\theta \end{bmatrix} \begin{bmatrix} x_0 \\ y_0 \end{bmatrix}$$

$$\begin{bmatrix} u_0 \\ v_0 \end{bmatrix} = \begin{bmatrix} x_0 \\ y_0 \end{bmatrix} - \begin{bmatrix} x'_0 \\ y'_0 \end{bmatrix} \quad (1)$$

$$= \begin{bmatrix} x_0 \\ y_0 \end{bmatrix} - \begin{bmatrix} a \\ b \end{bmatrix} - \begin{bmatrix} \cos\theta & -\sin\theta \\ \sin\theta & \cos\theta \end{bmatrix} \begin{bmatrix} x_0 \\ y_0 \end{bmatrix}$$

$$= -\begin{bmatrix} a \\ b \end{bmatrix} + \left(I - \begin{bmatrix} \cos\theta & -\sin\theta \\ \sin\theta & \cos\theta \end{bmatrix}\right) \begin{bmatrix} x_0 \\ y_0 \end{bmatrix}$$

$$\begin{bmatrix} u_1 \\ v_1 \end{bmatrix} = -\begin{bmatrix} a \\ b \end{bmatrix} + \left(I - \begin{bmatrix} \cos\theta & -\sin\theta \\ \sin\theta & \cos\theta \end{bmatrix}\right) \begin{bmatrix} x_1 \\ y_1 \end{bmatrix} \quad (2)$$

From (2) − (1)     (Expression 6)

$$\begin{bmatrix} u_1 \\ v_1 \end{bmatrix} - \begin{bmatrix} u_0 \\ v_0 \end{bmatrix} = \left(I - \begin{bmatrix} \cos\theta & -\sin\theta \\ \sin\theta & \cos\theta \end{bmatrix}\right)\left(\begin{bmatrix} x_1 \\ y_1 \end{bmatrix} - \begin{bmatrix} x_0 \\ y_0 \end{bmatrix}\right)$$

$$\begin{bmatrix} u_1 \\ v_1 \end{bmatrix} = \left(I - \begin{bmatrix} \cos\theta & -\sin\theta \\ \sin\theta & \cos\theta \end{bmatrix}\right)\left(\begin{bmatrix} x_1 \\ y_1 \end{bmatrix} - \begin{bmatrix} x_0 \\ y_0 \end{bmatrix}\right) + \begin{bmatrix} u_0 \\ v_0 \end{bmatrix}$$

In addition, in the expression (Expression 6),

I is a unit matrix, corresponds to a rotation matrix at $\theta$=0, and is a matrix which is represented by the following expression (Expression 7).

[Numerical Expression 6]

$$I = \begin{bmatrix} 1 & 0 \\ 0 & 1 \end{bmatrix} \quad \text{(Expression 7)}$$

On the basis of the expression (Expression 6), the difference between the local motion vector (LMV) (u1, v1) of the target block and the local motion vector (LMV) (u0, v0) of the near-field block can be represented by the following expression (Expression 8).

[Numerical Expression 7]

$$\begin{bmatrix} u_1 - u_0 \\ v_1 - v_0 \end{bmatrix} = \begin{bmatrix} 1 - \cos\theta & \sin\theta \\ -\sin\theta & 1 - \cos\theta \end{bmatrix} \begin{bmatrix} x_1 - x_0 \\ y_1 - y_0 \end{bmatrix} \quad \text{(Expression 8)}$$

In the expression (Expression 8), (x1, y1) are coordinates of one feature point of the target block, (x0, y0) are coordinates of one feature point of the near-field block, and $\theta$ is a rotation angle applied to the process of the coordinate transformation based on the three-axis-compliant global motion vector (GMV) represented by the above-mentioned expression (Expression 6), and corresponds to the rotation angle in the global motion of the whole screen.

Here, an amount of rotation allowed as global motion is $-\theta max \leq \theta \leq \theta max$.

The allowable amount of rotation is defined by for example a correctable angle for an image which is rotated by hand shaking of the imaging apparatus (camera).

Specifically, for example, the determination is made on the basis of the number of pixel lines of the imaging apparatus in the horizontal direction and the like. The number of horizontal pixel lines of an image, which is generated as an output image of the imaging apparatus, is set to be smaller than that of horizontal lines of the imaging device of the imaging apparatus. Thus, when correction is necessary for image rotation caused by hand shaking or the like, it is possible to generate a corrected image which is obtained by rotating an image on the basis of the upper and lower pixel information of the imaging device.

When there are multiple horizontal pixel lines on the upper and lower parts of the captured image, it is possible to perform a correction process which rotates by a large angle. However, when there are a small number of horizontal pixel lines on the upper and lower parts of the captured image, the correction process, which rotates by a large angle, is not possible.

The allowable rotation angle $\theta$ is defined by a configuration or the like of the imaging device.

As described above, for example, in accordance with the configuration of the imaging device, a correctable angular range of $-\theta max$ to $\theta max$ is defined, and the angular range is set as the allowable amount of rotation of the global motion.

Regarding the allowable amount of rotation, $-\theta max \leq \theta \leq \theta max$ the range of $\theta$ is substituted into the expression (Expression 7), whereby it is possible to calculate the allowable range of the difference between the local motion vector (LMV) (u1, v1) of the target block, and the local motion vector (LMV) (u0, v0) of the near-field block.

That is, it is determined whether or not the values of the difference between the local motion vector (LMV) (u1, v1) of the target block, and the local motion vector (LMV) (u0, v0) of the near-field block, that is, $u1 - u0$, and $v1 - v0$, satisfy the following conditional expressions (Expression A), (Expression B).

$(x1-x0)(1-cos\theta max) - |y1-y0|\sin\theta max \leq u1-u0 \leq (x1-x0)(1-cos\theta max) + |y1-y0|\sin\theta max$    (Expression A)

$-|x1-x0|\sin\theta max + (y1-y0)(1-cos\theta max) \leq v1-v0 \leq |x1-x0|\sin\theta max + (y1-y0)(1-cos\theta max)$    (Expression B)

If the difference between the values of the local motion vector (LMV) (u1, v1) of the target block, and the local motion vector (LMV) (u0, v0) of the near-field block, that is, $u1 - u0$, and $v1 - v0$, satisfy the above-mentioned conditional expressions (Expression A), (Expression B), then it is determined that the global motion vector (GMV), which is defined by these two local motion vectors, has the rotation angle $\theta$ in the allowable range, that is, $-\theta max \leq \theta \leq \theta max$ as the above-mentioned range of $\theta$.

That is, if the difference between the local motion vector (LMV) (u1, v1) of the target block, and the local motion vector (LMV) (u0, v0) of the near-field block satisfies both determination expressions (Expression A), (Expression B) mentioned above, then it can be determined that these two local motion vectors (LMV) are similar local motion vectors (LMV) corresponding to a single GMV which has the correctable allowable rotation angle.

In this case, it is determined that the local motion vector (LMV) (u1, v1) of the target block, and the local motion vector (LMV) (u0, v0) of the near-field block are similar. That is, the degree of similarity is set to 1.

In contrast, if the difference between the local motion vector (LMV) (u1, v1) of the target block, and the local motion vector (LMV) (u0, v0) of the near-field block does not satisfy at least one of determination expressions (Expression A), (Expression B) mentioned above, then it can be determined that these two local motion vectors (LMV) are not similar local motion vectors (LMV) corresponding to a single GMV which has the correctable allowable rotation angle.

In this case, it is determined that the local motion vector (LMV) (u1, v1) of the target block, and the local motion vector (LMV) (u0, v0) of the near-field block are not similar. That is, the degree of similarity is set to 0.

It should be noted that the similarity determination process based on the expressions (Expression A), (Expression B) is an example. Further, for example, it may be possible to adopt a configuration in which, in consideration of calculation error of GMV or LMV or the like, the similarity determination is performed by applying the following determination expressions (Expression A2), (Expression B2) including a preset constant C.

$(x1-x0)(1-cos\theta max)-C-|y1-y0|\sin \theta max \leq u1-u0 \leq (x1-x0)(1-cos\theta max)+C+|y1-y0|\sin \theta max$    (Expression A2)

$-C-|x1-x0|\sin \theta max+(y1-y0)(1-cos\theta max)\leq v1-v0\leq C+|x1-x0|\sin \theta max+(y1-y0)(1-cos\theta max)$    (Expression B2)

That is, if the difference between the local motion vector (LMV) (u1, v1) of the target block, and the local motion vector (LMV) (u0, v0) of the near-field block satisfies both determination expressions (Expression A2), (Expression B2) mentioned above, then it can be determined that these two local motion vectors (LMV) are similar local motion vectors (LMV) corresponding to a single GMV which has the correctable allowable rotation angle.

In this case, it is determined that the local motion vector (LMV) (u1, v1) of the target block, and the local motion vector (LMV) (u0, v0) of the near-field block are similar. That is, the degree of similarity is set to 1.

In contrast, if the difference between the local motion vector (LMV) (u1, v1) of the target block, and the local motion vector (LMV) (u0, v0) of the near-field block does not satisfy at least one of determination expressions (Expression A2), (Expression B2) mentioned above, then it can be determined that these two local motion vectors (LMV) are not similar local motion vectors (LMV) corresponding to a single GMV which has the correctable allowable rotation angle.

In this case, it is determined that the local motion vector (LMV) (u1, v1) of the target block, and the local motion vector (LMV) (u0, v0) of the near-field block are not similar. That is, the degree of similarity is set to 0.

The above-mentioned similarity determination process is to determine whether or not the local motion vector (LMV) of the target block and the local motion vector (LMV) of the near-field block correspond to rotation based on the rotation angle $\theta$ corresponding to the single global motion vector (GMV).

The correspondence relationship between the similarity determination process and the motion of the image frame will be described with reference to FIG. 11.

Figure 11:
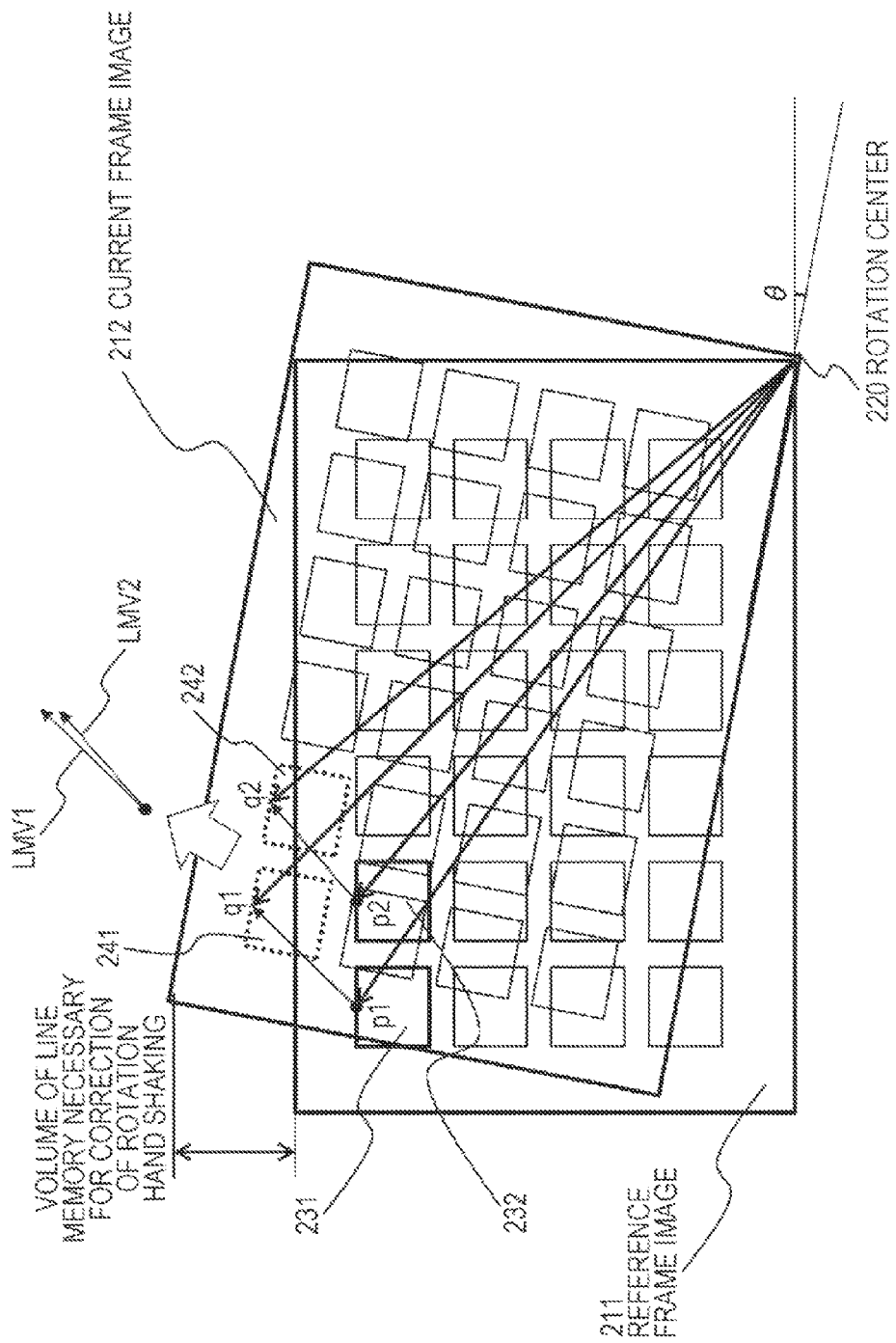
FIG. 11 is a diagram illustrating the similarity determination process applied to the block weight determination process executed in the image processing apparatus of the present disclosure.

As shown in FIG. 11, it is assumed that a reference frame image 211 and a current frame image 212, which are continuous photographed images, are rotated by an angle $\theta$ about a rotation center 220 due to, for example, hand shaking.

Here, vectors directed to two adjacent blocks 231 and 232 of the reference frame image 211 are represented as p1 and p2.

Further, vectors directed to two adjacent blocks 241 and 242 of the rotated current frame image 212 are represented as q1 and q2.

A rotation matrix, which is for converting the coordinate positions (x, y) of the reference frame image 211 into corresponding coordinate positions (x', y') of the current frame image 212, is represented as R($\theta$).

A relationship of these parameters is represented as follows.

$q1=R(\theta)p1$ $q2=R(\theta)p2$

At this time, expected values of the local motion vectors (LMV) of the blocks are $LMV1=q1-p1$, and $LMV2=q2-p2$.

Further, the difference value between the local motion vectors (LMV) of the adjacent blocks is represented as follows.

$$LMV2 - LMV1 = (q2 - p2) - (q1 - p1)$$
$$= (R(\theta) - E)(p1 - p2).$$

It should be noted that E is a unit matrix.

As described above, the difference value (LMV2−LMV1) between the local motion vectors (LMV) of the adjacent blocks can be represented by the rotation matrix R($\theta$) and the position vector (p1−p2) between the blocks.

When the above-mentioned expressions (Expression A), (Expression B), or expressions (Expression A2), (Expression 2B) are satisfied, the difference in the local motion vector (LMV) between two adjacent blocks is approximate to the expected value. In this case, the local motion vectors (LMV) of the two adjacent blocks are similar. That is, it is determined that the degree of similarity=1.

As described above, the determination as to whether or not the local motion vectors (LMV) of the adjacent blocks are similar is performed in the same process as the determination as to whether or not the local motion vector (LMV) according to the rotation corresponding to the single global motion vector (GMV) is calculated for each adjacent block.

Either the local motion vector (LMV) of the target block or the local motion vector (LMV) of the reference near-field block may be the local motion vector (LMV) according to the rotation corresponding to the single global motion vector (GMV) which indicates the motion of the entire screen. In such a case, the local motion vectors (LMV) of the two blocks are similar, that is, it is determined that the degree of similarity=1.

In contrast, the local motion vector (LMV) of the target block and the local motion vector (LMV) of the reference block near that may not be the local motion vector (LMV) according to the rotation corresponding to the single global motion vector (GMV) which indicates the motion of the entire screen. In such a case, the local motion vectors (LMV) of the two blocks are not similar, that is, it is determined that the degree of similarity=0.

Figure 12:
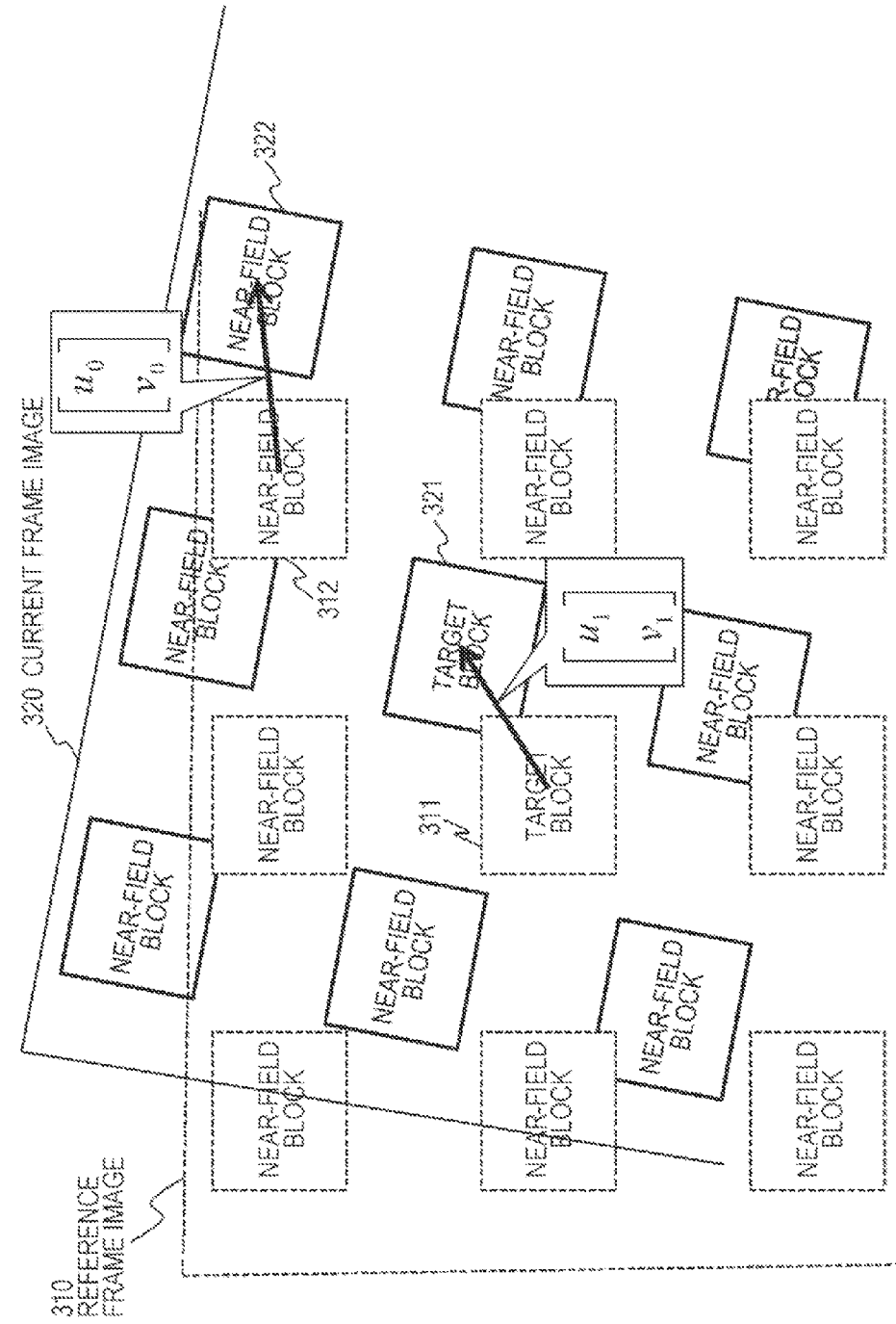
FIG. 12 is a diagram illustrating the similarity determination process applied to the block weight determination process executed in the image processing apparatus of the present disclosure.

FIG. 12 is a diagram illustrating a concept of the similarity determination process.

FIG. 12 shows a reference frame image 310 and a current frame image 320 which are continuous photographed images.

The two images are continuous photographed images, but are rotated by the effect of hand shaking.

The blocks for calculating the local motion vectors (LMV) are set in the current frame image 320, the local motion vectors (LMV) corresponding to the respective blocks are calculated by applying the above-mentioned block matching process and the like.

It should be noted that the blocks may be set to be discretely distributed in the image, as shown in the drawing.

First, in the description of the example of the block setting described above with reference to FIG. 3, the blocks are set without spacings. However, as shown in FIG. 12, a plurality of blocks may be set to be separated by setting spacings between the blocks.

The block of the reference frame 310 corresponding to a target block 321 of the current frame 320 shown in FIG. 12 is a target block 311 shown in the drawing.

The local motion vector (LMV) corresponding to the target block 321 is (u1, v1).

Further, a block of the reference frame 310 corresponding to a near-field block 322 of the current frame 320 is a near-field block 312 shown in the drawing.

The local motion vector (LMV) corresponding to the near-field block 322 is (u0, v0).

When the two vectors are local motion vectors (LMV) according to the rotation corresponding to the single global motion vector (GMV) which indicates the motion of the entire screen, the local motion vectors (LMV) of the two blocks are similar, that is, it is determined that the degree of similarity=1.

In contrast, when the two vectors are not local motion vectors (LMV) according to the rotation corresponding to the single global motion vector (GMV) which indicates the motion of the entire screen, the local motion vectors (LMV) of the two blocks are not similar, that is, it is determined that the degree of similarity=0.

[5. Example of Weight Calculation Process Based on Determination of Degrees of Reliability and Degrees of Similarity of LMVs of Adjacent Blocks]

Next, an example of the weight calculation process based on the determination of degrees of reliability and degrees of similarity of LMVs of the adjacent blocks will be described.

In step S110 of the flow shown in FIG. 9 described above, as the example of the process of calculating the weight of the target block, an example of a process of calculating the weight of the target block based on the following expression was described.

Weight=(under_threshhold_Cnt)/(Reliability_Cnt)

That is, the weight of the target block=(the number of reliable blocks equal to or less than the differential threshold value (degree of reliability=1) among the near-field blocks)/(the number of reliable blocks among the near-field blocks), whereby the weight of the target block is calculated in the example of the process.

Hereinafter, a plurality of examples of the process of calculating the weight of the target block will be described.

When the process according to the flow shown in FIG. 9 is executed, for the nine blocks including one target block and eight near-field blocks adjacent thereto, the degrees of reliability and the degrees of similarity of the local motion vectors (LMV) corresponding to the blocks are set.

Figure 13:
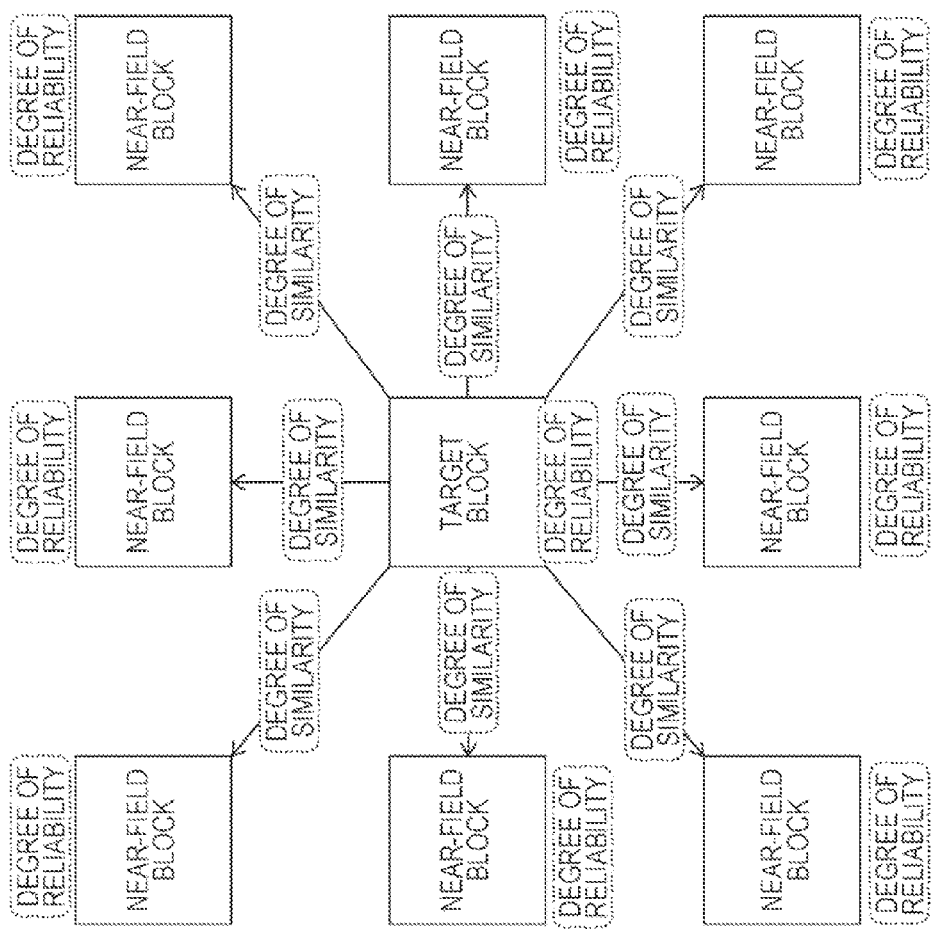
FIG. 13 is a diagram illustrating an example of setting the degrees of reliability and the degrees of similarity applied to a weight setting process executed in the image processing apparatus of the present disclosure.

Specifically, as shown in FIG. 13, for the nine blocks including one target block and eight near-field blocks adjacent thereto, the degrees of reliability of the local motion vectors (LMV) of the respective nine blocks, the degrees of similarity between the target block and the eight near-field blocks, and determination data generated from the degrees of reliability and the degrees of similarity are calculated.

The block weight calculation section 102 shown in FIG. 4 calculates the weight of the target block in step S110 of the flow shown in FIG. 9.

The weight calculation can be performed by applying, for example, any of the following expressions (Expression C1), (Expression C2), (Expression C3).

[Numerical Expression 8]

$$W = \frac{\sum_{i \in near\,field} S_i R_i}{\sum_{i \in near\,field} R_i} R_0 \quad \text{(Expression C1)}$$

[Numerical Expression 9]

$$W = \frac{\sum_{i \in near\,field} S_i R_i}{\sum_{i \in near\,field} R_i} \quad \text{(Expression C2)}$$

[Numerical Expression 10]

$$W = \frac{\sum_{i \in near\,field} S_i}{\sum_{i \in near\,field} R_i} \quad \text{(Expression C3)}$$

Here, in the expressions (Expression C1) to (Expression C3), $R_0$ is a degree of reliability of the target block,
$R_i$ is a degree of reliability of the i-th near-field block, Si is a degree of similarity between the target block and the i-th near-field block, and i is an identification number i=1 to 8 of the near-field block.

The expression (Expression C1) is an expression that calculates the weight W by multiplying the degree of reliability R0 of the target block with a result of dividing a result of addition of values, which are obtained by multiplying the degrees of similarity Si between the target block and the near-field blocks with the degrees of reliability Ri of the near-field blocks, by a value of addition of the degrees of reliability Ri of the near-field blocks.

The expression (Expression C2) is an expression that calculates, as the block weight W, a result of dividing a result of addition of values, which are obtained by multiplying the degrees of similarity Si between the target block and the near-field blocks with the degrees of reliability Ri of the near-field blocks, by a value of addition of the degrees of reliability Ri of the near-field blocks.

The expression (Expression C3) is an expression that calculates, as the block weight W, a result of dividing a value of addition of the degrees of similarity Si between the target block and the near-field blocks by a value of addition of the degrees of reliability Ri of the near-field blocks.

The block weight calculation section 102 shown in FIG. 4 calculates the weight of the target block by applying any of the expressions (Expression C1) to (Expression C3) in step S110 of the flow shown in FIG. 9.

In addition, in the above description of the example of the process, the degree of reliability is set by two values of 0 and 1, and the degree of similarity is set by two values of 0 and 1, but for example, the degree of reliability may be in $0 \le R \le 1$, and the degree of similarity may be in $0 \le S \le 1$.

As described above, it may be possible to adopt a configuration in which the weight of the target block may be calculated by setting the degrees in the range of 0 to 1 and applying any of the expressions (Expression C1) to (Expression C3).

As described above, the block weight calculation section 102 shown in FIG. 4 sets the weights in which the degrees of reliability of LMVs corresponding to the blocks and the degrees of similarity between LMVs of the target block and the near-field blocks are considered, and outputs the weights to the global motion vector calculation section 103 shown in FIG. 4.

[6. Regarding Process of Global Motion Vector Calculation Section (GME)]

Next, a process (GME) of estimating the global motion vector (GMV), which is executed in the global motion vector calculation section (GME) 103 shown in FIG. 4, will be described.

The global motion vector calculation section (GME) 103 shown in FIG. 4 inputs the block weights calculated by the block weight calculation section 102 and the local motion vectors (LMV) corresponding to the respective blocks calculated by the local motion vector calculation section (LME) 101, and calculates the global motion vector (GMV) corresponding to the frame on the basis of the input data.

First, as described with reference to FIG. 2, in the global motion vector (GMV), a relationship between the corresponding similar pixel positions (x, y) and (x', y') between the current frame and the reference frame is represented as data using parallel movement, rotation, enlargement, reduction, affine transformation, projection shadow transformation, and the like, and normally the single global motion vector (GMV) is applied to the single frame image.

The types of the global motion vector (GMV) include, for example, a global motion vector (GMV) of three axes (three degrees of freedom), in which parallel movement (translation) and rotation are considered, and a global motion vector (GMV) of six axes (six degrees of freedom) corresponding to affine transformation.

A configuration, in which the process of estimating the two types of GMVs (GME) is executed, will be described.

Figure 14:
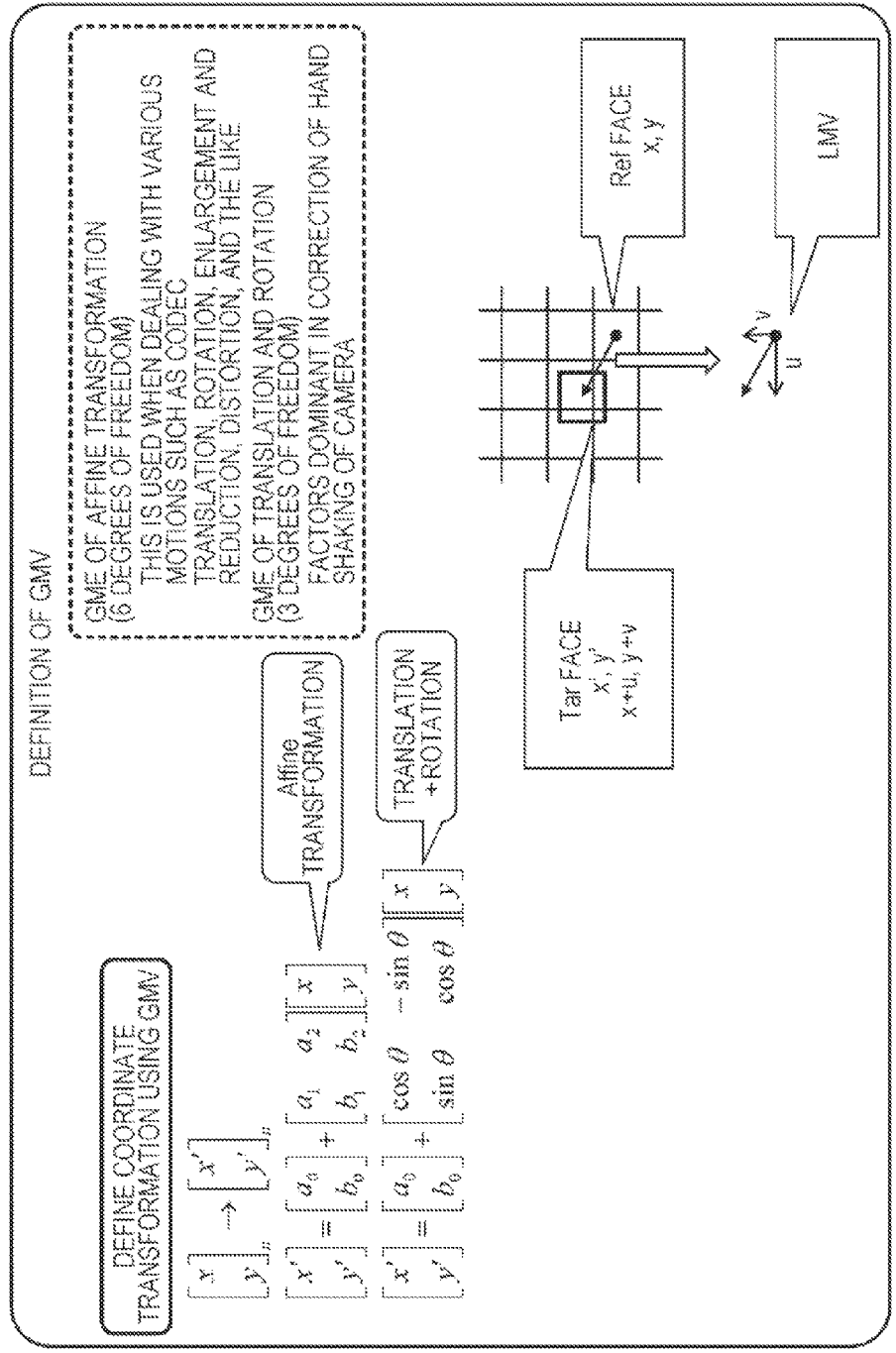
FIG. 14 is a diagram illustrating a definition of the global motion vector (GMV) executed in the image processing apparatus of the present disclosure.

The definitions of the global motion vector (GMV) and the GME will be described with reference to FIG. 14.

The coordinate transformation based on the GMV is defined by the following expression.

[Numerical Expression 11]

$$\begin{bmatrix} x \\ y \end{bmatrix}_n \rightarrow \begin{bmatrix} x' \\ y' \end{bmatrix}_n$$

$$\begin{bmatrix} x' \\ y' \end{bmatrix} = \begin{bmatrix} a_0 \\ b_0 \end{bmatrix} + \begin{bmatrix} a_1 & a_2 \\ b_1 & b_2 \end{bmatrix} \begin{bmatrix} x \\ y \end{bmatrix}$$

AFFINE TRANSFORMATION $$\begin{bmatrix} x' \\ y' \end{bmatrix} = \begin{bmatrix} a_0 \\ b_0 \end{bmatrix} + \begin{bmatrix} \cos\theta & -\sin\theta \\ \sin\theta & \cos\theta \end{bmatrix} \begin{bmatrix} x \\ y \end{bmatrix}$$

TRANSLATION + ROTATION

The affine transformation represented in the expression is coordinate transformation in a case of applying the above-mentioned six-axis-compliant global motion vector (GMV).

Further, translation+rotation is coordinate transformation in a case of applying the three-axis-compliant global motion vector (GMV).

The affine transformation (six degrees of freedom) is used, for example, when it is necessary to be compliant with various motions such as CODEC. The motions include translation, rotation, enlargement and reduction, distortion, and the like.

In contrast, translation and rotation (three degrees of freedom) are dominant factors in correction for hand shaking of a camera.

In addition, setting of the definitions of the parameters in the expression and the weights Wn of the local motion vectors (LMV) corresponding to the respective blocks n is made as the following setting.

[Numerical Expression 12]

$\begin{bmatrix} x \\ y \end{bmatrix}_n$ : GRID POINT $\begin{bmatrix} x' \\ y' \end{bmatrix}_n$ : CORRESPONDING POINT ON TARGET FACE $\begin{bmatrix} u \\ v \end{bmatrix}_n$ : LMV $W_n$: WEIGHT BASED ON DEGREE OF RELIABILITY $0 \le W_n \le 1$ $W_n = 0$: CORRESPONDING $LMV$ IS NOT USED $0 < W_n < 1$: CORRESPONDING $LMV$ IS PARTIALLY RELIABLE $W_n = 1$: CORRESPONDING $LMV$ IS RELIABLE AND USED In the expression, the grid point is a feature point of each block n, n is an identification number of the block, Wn is a weight of the block n.

The three-axis-compliant global motion vector (GMV) with three degrees of freedom and the six-axis-compliant global motion vector (GMV) with six degrees of freedom are finally calculated, as shown in FIG. 15, by the following expression.

[Numerical Expression 13]

$$\text{Cost} = \sum_n W_n \left\| \begin{bmatrix} x' \\ y' \end{bmatrix}_n - \left( \begin{bmatrix} x \\ y \end{bmatrix}_n + \begin{bmatrix} u \\ v \end{bmatrix}_n \right) \right\|^2$$

$$0 \leq W_n \leq 1$$

$$GMV = \arg\min_{a,b,\theta} \text{cost}\left( \begin{bmatrix} x \\ y \end{bmatrix}_n, \begin{bmatrix} u \\ v \end{bmatrix}_n, \begin{bmatrix} a \\ b \end{bmatrix}, \theta \right)$$

THREE-AXIS-COMPLIANT GMV $$GMV = \arg\min_{a_0,a_1,a_2,b_0,b_1,b_2,} \text{Cost}\left( \begin{bmatrix} x \\ y \end{bmatrix}_n, \begin{bmatrix} u \\ v \end{bmatrix}_n, \begin{bmatrix} a_0 \\ b_0 \end{bmatrix}, \begin{bmatrix} a_1 & a_2 \\ b_1 & b_2 \end{bmatrix} \right)$$

SIX-AXIS-COMPLIANT GMV

The Cost represented in the expression is a value of summation between the weights Wn corresponding to blocks n and the data of squared differences between the positions of local motion vectors (LMV) (u, v) applied to the feature points (x, y) of the blocks n and the corresponding points (x', y').

The parameters of the three-axis-compliant GMV or the six-axis-compliant GMV represented in the expression are calculated to minimize the Cost.

The parameters of the three-axis-compliant GMV are parameters a, b, and θ for parallel movement (translation) and rotation.

The parameters of the six-axis-compliant GMV are parameters a0, a1, a2, b0, b1, and b2 for affine transformation.

It should be noted that, for example, a least-squares method is applied to the process of calculating the parameters at which the Cost is minimized.

In addition, a specific process of calculating the three-axis-compliant global motion vector (GMV) or the six-axis-compliant global motion vector (GMV) represented in the expression is described in, for example, the above-mentioned PTL 1 (Japanese Unexamined Patent Application Publication No. 2009-065332).

At the time of the process of calculating the global motion vector in the configuration of the present application, for example, the method disclosed in PTL 1 (Japanese Unexamined Patent Application Publication No. 2009-065332) can be applied.

As described above, in the process of calculating the global motion vector (GMV) according to the present application, the process is executed in the following processing sequence.

First, the local motion vector calculation section 101 shown in FIG. 4 sets blocks in the image frame, thereby obtaining the local motion vectors (LMV) corresponding to the set blocks.

In addition, the blocks may be set in the spacings as shown in FIG. 3, and may be set as discrete blocks which are disposed to be separated with spacings interposed as shown in FIGS. 11 and 12.

Next, the block weight calculation section 102 shown in FIG. 4 sets the weights in which the degrees of reliability of the LMVs corresponding to the blocks and the degrees of similarity between the LMVs of the target block and the near-field blocks are considered, and outputs the weights to the global motion vector calculation section 103 shown in FIG. 4.

Finally, the global motion vector calculation section 103 inputs the block weights (Weights), which are calculated by the block weight calculation section 102, and the local motion vectors (LMV) corresponding to the respective blocks which are calculated by the local motion vector calculation section (LME) 101, and calculates the global motion vector (GMV) corresponding to the frame on the basis of such input data.

In the process of the present application, for example, when the number of reliable local motion vectors (LMV) is small, the global motion can be estimated (GME) focusing on the similar local motion vectors (LMV). This leads to an effect that stabilizes the calculated global motion vector (GMV).

For example, specifically, the number of reliable local motion vectors (LMV) may be excessively small, and thus it is possible to reduce cases of giving up estimation of the global motion vector (GMV).

[7. Regarding Configuration Example of Image Processing Apparatus]

Finally, referring to FIGS. 16 and 17, the configuration example of the image processing apparatus, which executes the above-mentioned process, will be described.

Figure 16:
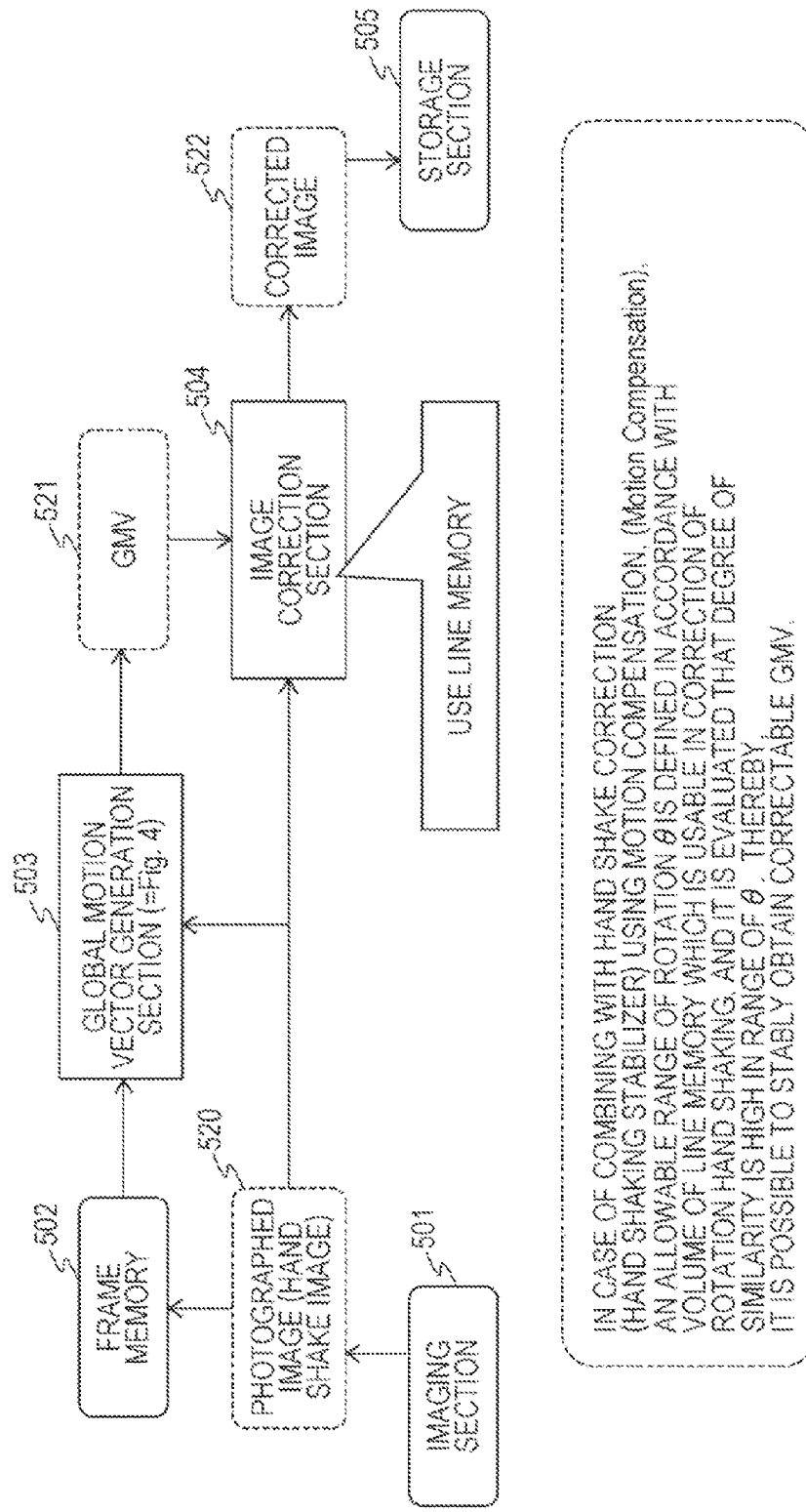
FIG. 16 is a diagram illustrating a process and a structure of an imaging apparatus as an example of the image processing apparatus of the present disclosure.

FIG. 16 is an example of an apparatus configuration as an imaging apparatus.

An imaging apparatus 500 shown in FIG. 16 has an imaging section 501, a frame memory 502, a global motion vector generation section 503, an image correction section 504, and a storage section 505.

The imaging section 501 continuously photographs images. The photographed images 520 included in the continuous photographed images are sequentially stored in the frame memory 502.

For example, in such continuous photographed images, image deviation occurs between the image frames due to the effect of hand shaking or the like.

The global motion vector generation section 503 calculates the global motion vector (GMV), which indicates the motion of the whole image, by applying the images sequentially stored in the frame memory 502.

The global motion vector generation section 503 has the above-mentioned configuration of FIG. 4. The global motion vector generation section 503 calculates the global motion vector (GMV), which indicates the motion of the whole image, by executing the process according to the flow shown in FIG. 7 described above.

The generated global motion vector (GMV) 521 is input to the image correction section 504.

The image correction section 504 generates a corrected image 522 in which image deviation such as rotation of the image is corrected by applying the global motion vector (GMV) 521 generated by the global motion vector generation section 503, and stores the image in the storage section 505.

It should be noted that, when a rotated image is corrected in the image correction section 504, as described above, pixel information, which is input from the imaging device of the imaging section, is necessary, and as an amount of rotation increases, the number of necessary pixel lines increases.

As described above, the allowable amount of rotation θ is determined depending on the number of line memories.

The block weight calculation section (block weight calculation section 102 of FIG. 4) of the global motion vector generation section 502 executes determination on similarity in the local motion vector (LMV) between the adjacent blocks in consideration of the allowable amount of rotation θ which is determined depending on the number of line memories.

The global motion vector generation section 502 sets weights of the local motion vectors (LMV) of the blocks, of which the degrees of reliability are high and on which similarity determination is performed, such that the weights are high, thereby executing the process of calculating the global motion vector (GMV).

As described above, in the configuration of the present disclosure, in the case of combining with hand shake correction (hand shaking stabilizer) using the motion compensation, an allowable range of the rotation θ is defined in accordance with the volume of the line memory which is usable in the correction of the rotation hand shaking, and it is evaluated that the degree of similarity has a high value in the range of θ. Thereby, it is possible to stably obtain the correctable GMV.

FIG. 17 shows a hardware configuration example of a personal computer which is one hardware configuration example of the apparatus which executes the above-mentioned image processing.

A central processing unit (CPU) 701 executes various processes in accordance with the programs stored in a read only memory (ROM) 702 or a storage section 708. For example, a program, which determines the global motion vector (GMV) described in the above-mentioned example, is executed. In a random access memory (RAM) 703, programs executed by the CPU 701, data, and the like are appropriately stored. The CPU 701, the ROM 702, and the RAM 703 are connected to each other through a bus 704.

The CPU 701 is connected to an input/output interface 705 through the bus 704. An input section 706, which is formed of a keyboard, a mouse, a microphone, and the like, and an output section 707, which is formed of a display, a speaker, and the like, are connected to the input/output interface 705. The CPU 701 executes various processes in response to commands which are input from the input section 706, and outputs processing results to, for example, the output section 707.

A storage section 708, which is connected to the input/output interface 705, is formed as, for example, a hard disk, and stores the programs, which are executed by the CPU 701, and various kinds of data. A communication section 709 communicates with an external apparatus through a network such as the Internet or a local area network.

A drive 710, which is connected to the input/output interface 705, acquires recorded programs, data, and the like by driving a removable medium 711 such as a magnetic disk, an optical disc, a magnetooptical disc, or a semiconductor memory. The acquired programs and data are transferred to the storage section 708 as necessary.

[8. Summary of Configurations of Present Disclosure]

Referring to the specific examples, the examples of the present disclosure have hitherto been described in detail. However, it is obvious that a person skilled in the art can make various modifications to and substitutions from the embodiments without departing from the scope of the invention. That is, the invention has been disclosed by way of examples, and should not be construed restrictively. The scope of the invention should be determined with reference to the appended claims.

It should be noted that the technique disclosed in the present description may have the following configurations.

(1) An image processing apparatus including:

a local motion vector calculation section that sets blocks, which are divided regions of a frame image, with spacings interposed therebetween in the frame image, and calculates a motion vector, which corresponds to each set block, as a local motion vector (LMV);

a block weight calculation section that calculates a block weight as a reliability indicator of the local motion vector (LMV) which corresponds to each block; and a global motion vector calculation section that inputs the local motion vectors (LMV) and the block weights, and calculates a global motion vector (GMV) which is a common motion vector to the plurality of blocks included in the frame image, in which the block weight calculation section calculates a degree of reliability of the local motion vector (LMV) corresponding to each block of a target block and near-field blocks adjacent to the target block, and a degree of similarity between the local motion vectors (LMV) of the target block and each near-field block, and calculates the block weight through arithmetic processing to which the degree of reliability and the degree of similarity are applied.

(2) The image processing apparatus according to (1), in which the block weight calculation section extracts near-field blocks, of which the degrees of reliability are high, as reliable near-field blocks, extracts similar blocks, of which the degrees of similarity are high, among the reliable near-field blocks, and executes a process of setting a ratio of the similar blocks to the reliable near-field blocks as a weight of the target block.

(3) The image processing apparatus according to (1) or (2), in which the block weight calculation section calculates the degree of reliability by applying a sum of absolute pixel value differences between the blocks which are associated on the basis of the local motion vectors (LMV) corresponding to the respective blocks.

(4) The image processing apparatus according to any one of (1) to (3), in which the block weight calculation section calculates the degree of reliability by applying a number of feature points or a variance of the blocks which are associated on the basis of the local motion vectors (LMV) corresponding to the respective blocks.

(5) The image processing apparatus according to any one of (1) to (4), in which the block weight calculation section executes the calculation of the degree of similarity by determining whether or not each local motion vector (LMV) of the target block and the near-field blocks is approximate to a motion vector corresponding to rotation of one global motion (GMV).

(6) The image processing apparatus according to (5), in which the block weight calculation section executes the calculation of the degree of similarity by determining, in consideration of an allowable rotation angle at which rotation can be corrected by an image correction section in the image processing apparatus, whether or not each local motion vector (LMV) of the target block and the near-field blocks is approximate to the motion vector corresponding to the rotation of the global motion (GMV) within the allowable rotation angle.

(7) The image processing apparatus according to any one of (1) to (6), in which the block weight calculation section calculates the block weight by multiplying the degree of reliability of the target block with a result of dividing a result of addition of values, which are obtained by multiplying the degrees of similarity between the target block and the near-field blocks with the degrees of reliability of the near-field blocks, by a value of addition of the degrees of reliability of the near-field blocks.

(8) The image processing apparatus according to any one of (1) to (7), in which the block weight calculation section calculates, as the block weight, a result of dividing a result of addition of values, which are obtained by multiplying the degrees of similarity between the target block and the near-field blocks with the degrees of reliability of the near-field blocks, by a value of addition of the degrees of reliability of the near-field blocks.

(9) The image processing apparatus according to any one of (1) to (8), in which the block weight calculation section calculates, as the block weight, a result of dividing a value of addition of the degrees of similarity between the target block and the near-field blocks by a value of addition of the degrees of reliability of the near-field blocks.

(10) The image processing apparatus according to any one of (1) to (9), in which the global motion vector calculation section calculates parameters of the global motion vector (GMV) for minimizing a cost by applying a cost computation expression to which the local motion vectors (LMV) corresponding to the respective blocks and the respective block weights are applied.

(11) The image processing apparatus according to (10), in which the global motion vector calculation section calculates parameters of a three-axis-compliant global motion vector, in which translation and rotation are considered, or parameters of a six-axis-compliant global motion vector in which affine transformation is considered.

Further, the configuration of the present disclosure also includes a method of the process executed in the apparatus and system, a program which executes the process, and a recording medium in which the program is recorded.

The series of processes described in this specification can be executed by hardware, software, or a combined configuration of both. When the processes are executed by software, the processes can be executed by installing a program recording the process sequence into a memory within a computer embedded in dedicated hardware, or by installing the program into a general purpose computer capable of executing various processes. For example, the program can be pre-recorded on a recording medium. Other than being installed into a computer from a recording medium, the program can be received via a network such as a LAN (Local Area Network) or the Internet, and installed into a built-in recording medium such as a hard disk.

The various processes described in this specification may be executed not only time sequentially in the order as they appear in the description, but may be executed in parallel or independently depending on the throughput of the device executing the processes or as necessary. In addition, the term system as used in this specification refers to a logical assembly of a plurality of devices, and is not limited to one in which the constituent devices are located within the same casing.

INDUSTRIAL APPLICABILITY

As described above, according to a configuration of one example of the present disclosure, an apparatus and a method for executing calculation of a global motion vector (GMV) with a high degree of reliability are realized.

Specifically, local motion vectors (LMV) corresponding to blocks and block weights as reliability indicators of the LMVs of the respective blocks are calculated, and the global motion vector (GMV) is calculated on the basis of the block weights. By calculating a degree of reliability of the local motion vector (LMV) corresponding to each block of a target block and near-field blocks adjacent to the target block and a degree of similarity between the local motion vectors (LMV) of the target block and each near-field block, the block weight is calculated through arithmetic processing to which the degree of reliability and the degree of similarity are applied.

With the present configuration, it is possible to efficiently calculate the global motion vector (GMV) with a high degree of reliability.

REFERENCE SIGNS LIST 10, 11 FRAME IMAGE
21 MOTION VECTOR
101 LOCAL MOTION VECTOR CALCULATION SECTION (LME)
102 BLOCK WEIGHT CALCULATION SECTION
103 GLOBAL MOTION VECTOR (GMV) CALCULATION SECTION
500 IMAGING APPARATUS
501 IMAGING SECTION
502 FRAME MEMORY
503 GLOBAL MOTION VECTOR GENERATION SECTION
504 IMAGE CORRECTION SECTION
505 STORAGE SECTION
701 CPU
702 ROM
703 RAM
704 BUS
705 INPUT/OUTPUT INTERFACE
706 INPUT SECTION
707 OUTPUT SECTION
708 STORAGE SECTION
709 COMMUNICATION SECTION
710 DRIVE
711 REMOVABLE MEDIUM

The invention claimed is:

1. An image processing apparatus comprising:
a local motion vector calculation section that sets blocks, which are divided regions of a frame image, with spacings interposed therebetween in the frame image, and calculates a motion vector, which corresponds to each set block, as a local motion vector (LMV);
a block weight calculation section that calculates a block weight as a reliability indicator of the local motion vector (LMV) which corresponds to each block; and
a global motion vector calculation section that inputs the local motion vectors (LMV) and the block weights, and calculates a global motion vector (GMV) which is a common motion vector to the plurality of blocks included in the frame image,
wherein the block weight calculation section calculates a degree of reliability of the local motion vector (LMV) corresponding to each block of a target block and near-field blocks adjacent to the target block, and a degree of similarity between the local motion vectors (LMV) of the target block and each near-field block, and calculates the block weight through arithmetic processing to which the degree of reliability and the degree of similarity are applied,
wherein the block weight calculation section extracts near-field blocks, of which the degrees of reliability are high, as reliable near-field blocks, extracts similar blocks, of which the degrees of similarity are high, among the reliable near-field blocks, and executes a process of setting a ratio of the similar blocks to the reliable near-field blocks as a weight of the target block, and wherein the local motion vector calculation section, the block weight calculation section, and the global motion vector calculation section are each implemented via at least one processor.

2. The image processing apparatus according to claim 1, wherein the block weight calculation section calculates the degree of reliability by applying a sum of absolute pixel value differences between the blocks which are associated on the basis of the local motion vectors (LMV) corresponding to the respective blocks.

3. The image processing apparatus according to claim 1, wherein the block weight calculation section calculates the degree of reliability by applying the number of feature points or a variance of the blocks which are associated on the basis of the local motion vectors (LMV) corresponding to the respective blocks.

4. The image processing apparatus according to claim 1, wherein the block weight calculation section calculates the block weight by multiplying the degree of reliability of the target block with a result of dividing a result of addition of values, which are obtained by multiplying the degrees of similarity between the target block and the near-field blocks with the degrees of reliability of the near-field blocks, by a value of addition of the degrees of reliability of the near-field blocks.

5. The image processing apparatus according to claim 1, wherein the block weight calculation section calculates, as the block weight, a result of dividing a result of addition of values, which are obtained by multiplying the degrees of similarity between the target block and the near-field blocks with the degrees of reliability of the near-field blocks, by a value of addition of the degrees of reliability of the near-field blocks.

6. The image processing apparatus according to claim 1, wherein the block weight calculation section calculates, as the block weight, a result of dividing a value of addition of the degrees of similarity between the target block and the near-field blocks by a value of addition of the degrees of reliability of the near-field blocks.

7. The image processing apparatus according to claim 1, wherein the global motion vector calculation section calculates parameters of the global motion vector (GMV) for minimizing a cost by applying a cost computation expression to which the local motion vectors (LMV) corresponding to the respective blocks and the respective block weights are applied.

8. The image processing apparatus according to claim 7, wherein the global motion vector calculation section calculates parameters of a three-axis-compliant global motion vector, in which translation and rotation are considered, or parameters of a six-axis-compliant global motion vector in which affine transformation is considered.

9. An image processing apparatus comprising:
a local motion vector calculation section that sets blocks, which are divided regions of a frame image, with spacings interposed therebetween in the frame image, and calculates a motion vector, which corresponds to each set block, as a local motion vector (LMV);
a block weight calculation section that calculates a block weight as a reliability indicator of the local motion vector (LMV) which corresponds to each block; and
a global motion vector calculation section that inputs the local motion vectors (LMV) and the block weights, and calculates a global motion vector (GMV) which is a common motion vector to the plurality of blocks included in the frame image,
wherein the block weight calculation section calculates a degree of reliability of the local motion vector (LMV) corresponding to each block of a target block and near-field blocks adjacent to the target block, and a degree of similarity between the local motion vectors (LMV) of the target block and each near-field block, and calculates the block weight through arithmetic processing to which the degree of reliability and the degree of similarity are applied,
wherein the block weight calculation section executes the calculation of the degree of similarity by determining whether or not each local motion vector (LMV) of the target block and the near-field blocks is approximate to a motion vector corresponding to rotation of one global motion (GMV), and
wherein the local motion vector calculation section, the block weight calculation section, and the global motion vector calculation section are each implemented via at least one processor.

10. The image processing apparatus according to claim 9, wherein the block weight calculation section executes the calculation of the degree of similarity by determining, in consideration of an allowable rotation angle at which rotation can be corrected by an image correction section in the image processing apparatus, whether or not each local motion vector (LMV) of the target block and the near-field blocks is approximate to the motion vector corresponding to the rotation of the global motion (GMV) within the allowable rotation angle.

11. An image processing method executed by an image processing apparatus, the image processing method comprising:
setting blocks, which are divided regions of a frame image, with spacings interposed therebetween in the frame image, and calculating a motion vector, which corresponds to each set block, as a local motion vector (LMV);
calculating a block weight as a reliability indicator of the local motion vector (LMV) which corresponds to each block; and
inputting the local motion vectors (LMV) and the block weights, and calculating a global motion vector (GMV) which is a common motion vector to the plurality of blocks included in the frame image,
wherein a degree of reliability is calculated of the local motion vector (LMV) corresponding to each block of a target block and near-field blocks adjacent to the target block, and a degree of similarity is calculated between the local motion vectors (LMV) of the target block and each near-field block, and the block weight is calculated through arithmetic processing to which the degree of reliability and the degree of similarity are applied, and
wherein the near-field blocks, of which the degrees of reliability are high, are extracted as reliable near-field blocks, similar blocks, of which the degrees of similarity are high, are extracted among the reliable near-field blocks, and a ratio of the similar blocks to the reliable near-field blocks is set as a weight of the target block.

12. A non-transitory computer-readable medium having embodied thereon a program, which when executed by a processor of an image processing apparatus causes the image processing apparatus to execute a method, the method comprising:
setting blocks, which are divided regions of a frame image, with spacings interposed therebetween in the frame image, and calculating a motion vector, which corresponds to each set block, as a local motion vector (LMV);

calculating a block weight as a reliability indicator of the local motion vector (LMV) which corresponds to each block; and inputting the local motion vectors (LMV) and the block weights, and calculating a global motion vector (GMV) which is a common motion vector to the plurality of blocks included in the frame image, wherein, by calculating a degree of reliability of the local motion vector (LMV) corresponding to each block of a target block and near-field blocks adjacent to the target block and calculating a degree of similarity between the local motion vectors (LMV) of the target block and each near-field block, the block weight is calculated through arithmetic processing to which the degree of reliability and the degree of similarity are applied, and wherein the near-field blocks, of which the degrees of reliability are high, are extracted as reliable near-field blocks, similar blocks, of which the degrees of similarity are high, are extracted among the reliable near-field blocks, and a ratio of the similar blocks to the reliable near-field blocks is set as a weight of the target block.

* * * * *